US009569983B2

(12) United States Patent
Al-Maadeed

(10) Patent No.: US 9,569,983 B2
(45) Date of Patent: Feb. 14, 2017

(54) CONVERSION WHEEL

(71) Applicant: Muneera Al-Maadeed, Doha (QA)

(72) Inventor: Muneera Al-Maadeed, Doha (QA)

(*) Notice: Subject to any disclaimer, the term of this patent is extended or adjusted under 35 U.S.C. 154(b) by 0 days.

(21) Appl. No.: 14/034,928

(22) Filed: Sep. 24, 2013

(65) Prior Publication Data

US 2014/0087338 A1 Mar. 27, 2014

Related U.S. Application Data

(60) Provisional application No. 61/704,769, filed on Sep. 24, 2012.

(51) Int. Cl.
*G09B 19/06* (2006.01)
*G06F 17/22* (2006.01)

(52) U.S. Cl.
CPC ........... *G09B 19/06* (2013.01); *G06F 17/2223* (2013.01)

(58) Field of Classification Search
CPC ........... G09B 19/06; G09B 19/08; G09B 1/00; A63F 3/0402; G06F 17/2223
USPC ................................ 434/156, 157, 161, 171
See application file for complete search history.

(56) References Cited

U.S. PATENT DOCUMENTS

| D87,602 | S | 8/1932 | Spencer |
|---|---|---|---|
| D159,405 | S | 7/1950 | Bossart |
| 4,399,353 | A | 8/1983 | Adkins et al. |
| 4,711,632 | A | 12/1987 | Detrick |
| D334,765 | S | 4/1993 | Dunn et al. |
| 5,407,355 | A * | 4/1995 | Majzub .......... 434/160 |
| 5,640,587 | A | 6/1997 | Davis et al. |
| 5,727,949 | A | 3/1998 | Bar-Or et al. |
| D395,675 | S | 6/1998 | Perez |
| D396,060 | S | 7/1998 | Gilbride |
| 5,791,905 | A | 8/1998 | Larson, Jr. |
| D422,635 | S | 4/2000 | Clark |
| 6,265,651 | B1 | 7/2001 | Landtroop |
| 6,358,059 | B1 | 3/2002 | Li |
| 6,460,015 | B1 | 10/2002 | Hetherington et al. |
| 6,704,116 | B1 * | 3/2004 | Abulhab .......... 358/1.11 |
| D533,904 | S | 12/2006 | Ellis |
| D535,333 | S | 1/2007 | Ellis |
| 2002/0142270 | A1 * | 10/2002 | Furry .......... 434/159 |
| 2003/0067465 | A1 * | 4/2003 | Jelinek et al. .......... 345/467 |
| 2007/0020591 | A1 * | 1/2007 | AlSalem AlSabah .......... 434/159 |
| 2008/0048991 | A1 * | 2/2008 | Freeman et al. .......... 345/173 |
| 2008/0300861 | A1 * | 12/2008 | Emam et al. .......... 704/8 |

(Continued)

OTHER PUBLICATIONS

U.S. Appl. No. 29/432,964.

(Continued)

*Primary Examiner* — Bruk Gebremichael
(74) *Attorney, Agent, or Firm* — DLA Piper LLP (US)

(57) ABSTRACT

Latin-derived letters may be converted into Arabic letters by performing processing associated with causing, with a display module in communication with a processor circuit and a display, the display to display a wheel comprising a Latin-derived letter and a corresponding Arabic letter; performing processing associated with receiving, with a UI module in communication with the processor circuit and an input device, a selection of a Latin-derived letter via the input device; and performing processing associated with causing, with the display module, the display to display an Arabic letter corresponding to the Latin-derived letter in a window on the wheel.

7 Claims, 30 Drawing Sheets

(56) References Cited

U.S. PATENT DOCUMENTS

2009/0012775 A1* 1/2009 El Hady et al. .................. 704/2
2009/0144049 A1* 6/2009 Haddad et al. ................... 704/3
2009/0305208 A1* 12/2009 Stewart et al. ............... 434/258
2012/0035910 A1* 2/2012 Awaida et al. ................... 704/5

OTHER PUBLICATIONS

U.S. Appl. No. 29/432,964, filed Sep. 24, 2012, Pending.
International Search Report issued in International Application No. PCT/IB2013/002992 dated Sep. 18, 2014.
Written Opinion issued in International Application No. PCT/IB2013/002992 dated Sep. 18, 2014.
Anonymous; "Verb Wheels from Linguascope", dated Sep. 18, 2012; Retrieved from the internet at http://web.archive.org/web/20120918030142/http://www.verbwheel.co.uk/; retrieved Sep. 10, 2014.
Anonymous; "Chinese Zodiac Word Wheel: Printable Workseet—EnchantedLearning.com"; dated Jul. 13, 2012, retrieved from the internet at http://web.archive.org/web/20120713113213/http://www.enchantedlearning.com/wordwheels/themes/chinesezodiac/; retrieved on Sep. 10, 2014.

* cited by examiner

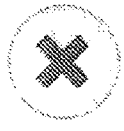
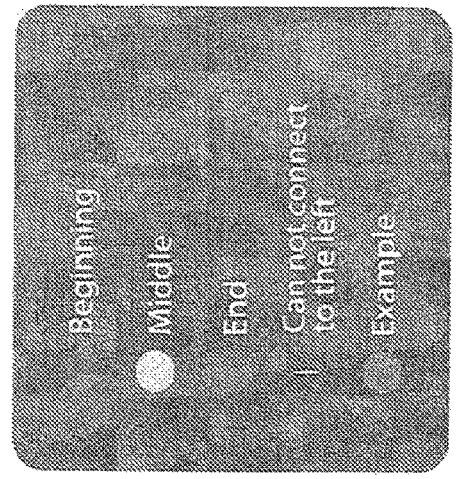
How to write you name in Arabic:  TSC-TSC Rule:
1. Type/Write        (Write your name in English)
2. Sound out         (Rewrite your name as you sound it out)
3. Clip              (Eliminate all letters of short vowels)
4. Turn around       (Write it from right to left)
5. Substitute        (Find the Arabic letter that corresponds to each English letter and substitute)
6. Connect           (Connect the letters)
FIG. 7D

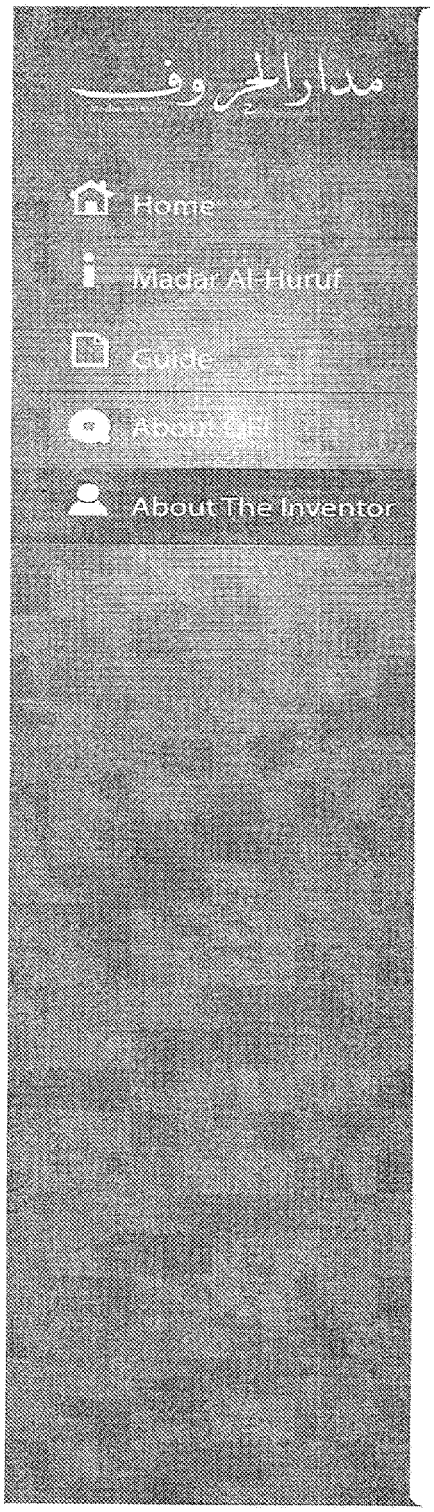

Moneera Hamad Al-Badi

Is a talented graphic designer from Doha, Qatar. She graduated Magna Cum Laude from Virginia Commonwealth University-Qatar. Moneera's vision is to combine art with education to make it easy and fun for students to learn and understand Arabic. She created and designed an innovative language wheel "Madar Al-Huruf" to be used for native English speakers and with no background in Arabic or the Arabic alphabet. Her future plans are to continue creating more visual tools and software with different languages to help spread education around the world in a creative and artistic style.

Contact: mal-badi@hotmail.com

"العلم نور.. والجهل ظلام"

Knowledge is light and ignorance is darkness
*Arabic Proverb*

FIG. 7E

Arabic alphabet:

Right to Left

| خ | ح | ج | ث | ت | ب | ا |
|---|---|---|---|---|---|---|
| Kha | Ha | Jeem | Thaa | Teh | Beh | Alf |
| ص | ش | س | ز | ر | ذ | د |
| Saad | Sheen | Seen | Zain | Ra | Thal | Dal |
| ق | ف | غ | ع | ظ | ط | ض |
| Qaf | Feh | Ghain | Ain | Dha | Ta | Daad |
| ي | و | ه | ن | م | ل | ك |
| Yeh | Waw | Ha | Nun | Meem | Lam | Kaf |

Not included on the wheel

Six Arabic letters that are not included on the wheel. Because they represent sounds that don't exist in English alphabet instead you would use letters with the same sound.

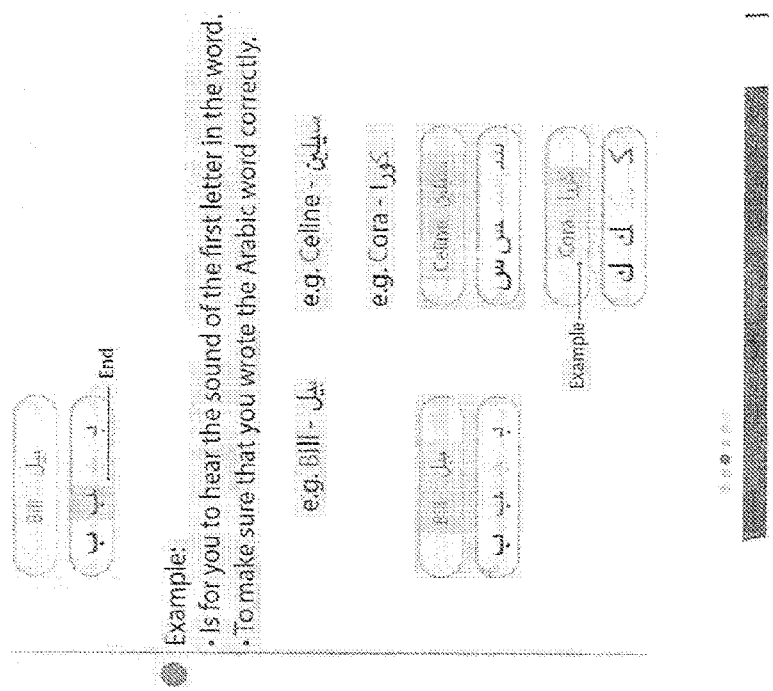
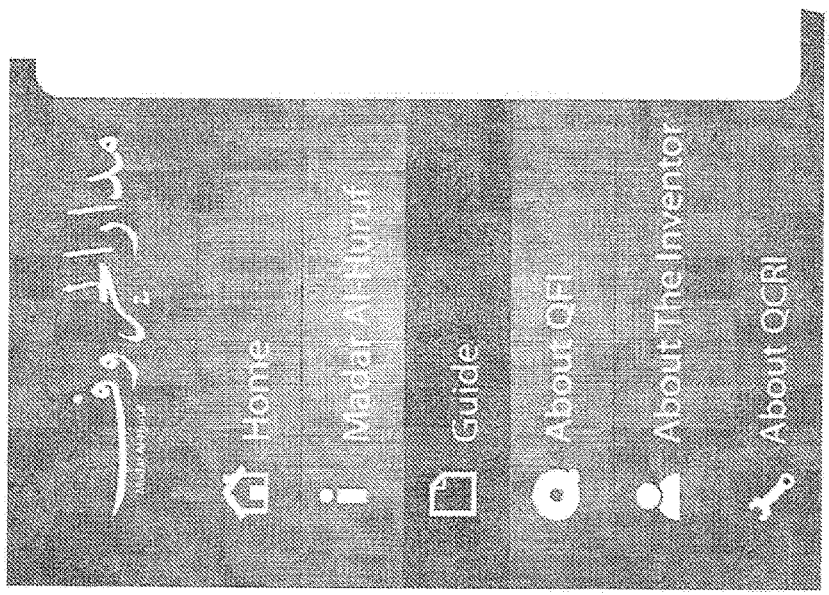
FIG. 9C

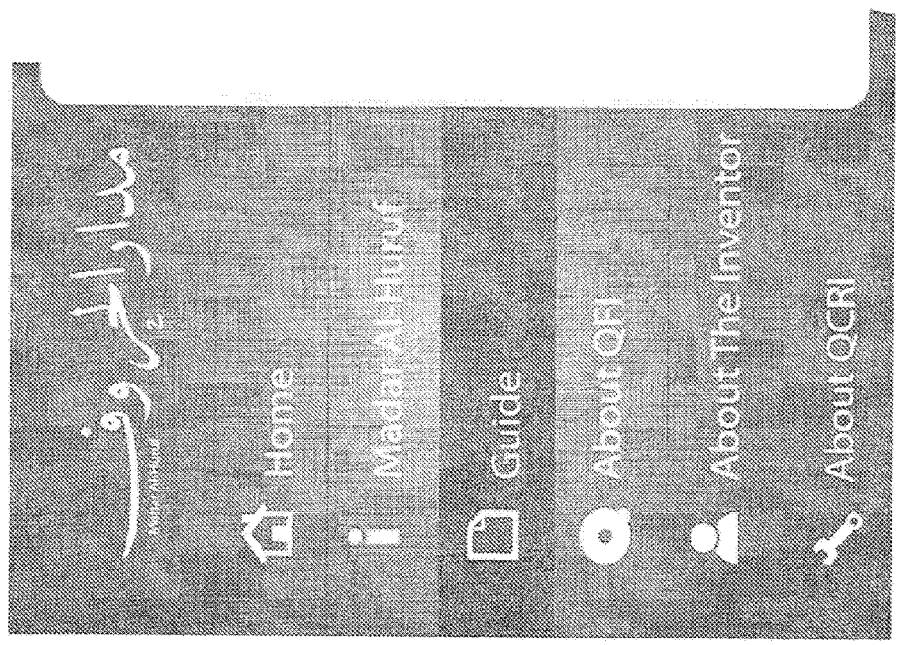
FIG. 9G

CONVERSION WHEEL

CROSS-REFERENCE TO RELATED APPLICATIONS

This application claims priority to U.S. Provisional Patent Application No. 61/704,769 filed Sep. 24, 2012, which is incorporated by reference in its entirety.

BRIEF DESCRIPTION OF THE DRAWINGS

FIGS. 7A-7F illustrate example screenshots, according to an embodiment of the invention.

FIG. 8 illustrates the Arabic alphabet.

FIGS. 9A-9G illustrate example guide screenshots, according to an embodiment of the invention.

DETAILED DESCRIPTION OF SEVERAL EMBODIMENTS

Systems and methods described herein may enable users to convert letters into Arabic letters. Various embodiments are described below, comprising a physical translation wheel embodiment and a computerized translation wheel embodiment.

The computerized translation wheel may use one or more computer systems. These systems and methods may comprise one or more computers (which may also be referred to as processors). A computer may be any programmable machine or machines capable of performing arithmetic and/or logical operations. In some embodiments, computers may comprise processor circuits, memory circuits, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. For example, though the term "mobile device" may appear in the following specification, the disclosed embodiments are not limited to mobile devices.

Computers may be linked to one another via a network or networks. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via Wi-Fi, WiMax, or other wireless connection). Connections between computers may use any protocols, including connection oriented protocols such as TCP or connectionless protocols such as UDP. Any connection through which at least two computers may exchange data can be the basis of a network.

Figure 1:
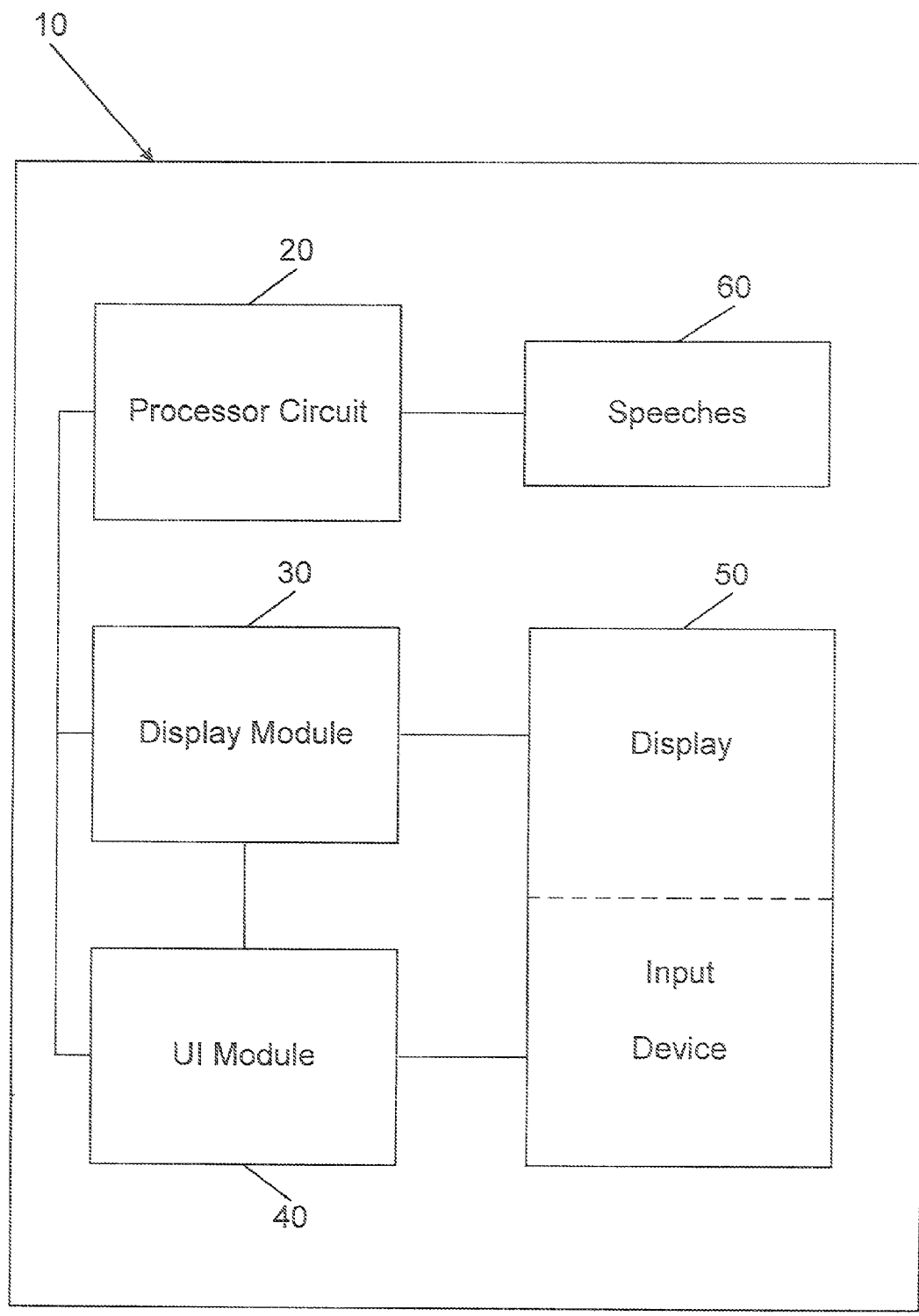
FIG. 1 illustrates a system for converting letters (e.g., English letters) into Arabic letters, according to an embodiment of the invention.

FIG. 1 illustrates a computerized system 10 for converting letters (e.g., English letters) into Arabic letters, according to an embodiment of the invention. The example system 10 may be a touchscreen equipped computer such as a smartphone or tablet, although any computer capable of performing the described functions may be used. The system 10 may include a processor circuit 20, a display module 30, a user interface (UI) module 40, a display/input device 50 (i.e., a touchscreen), and/or a speaker 60. In embodiments not using a touchscreen equipped computer, the display and input device may be separate elements, for example a monitor and a keyboard or mouse.

Figure 2:
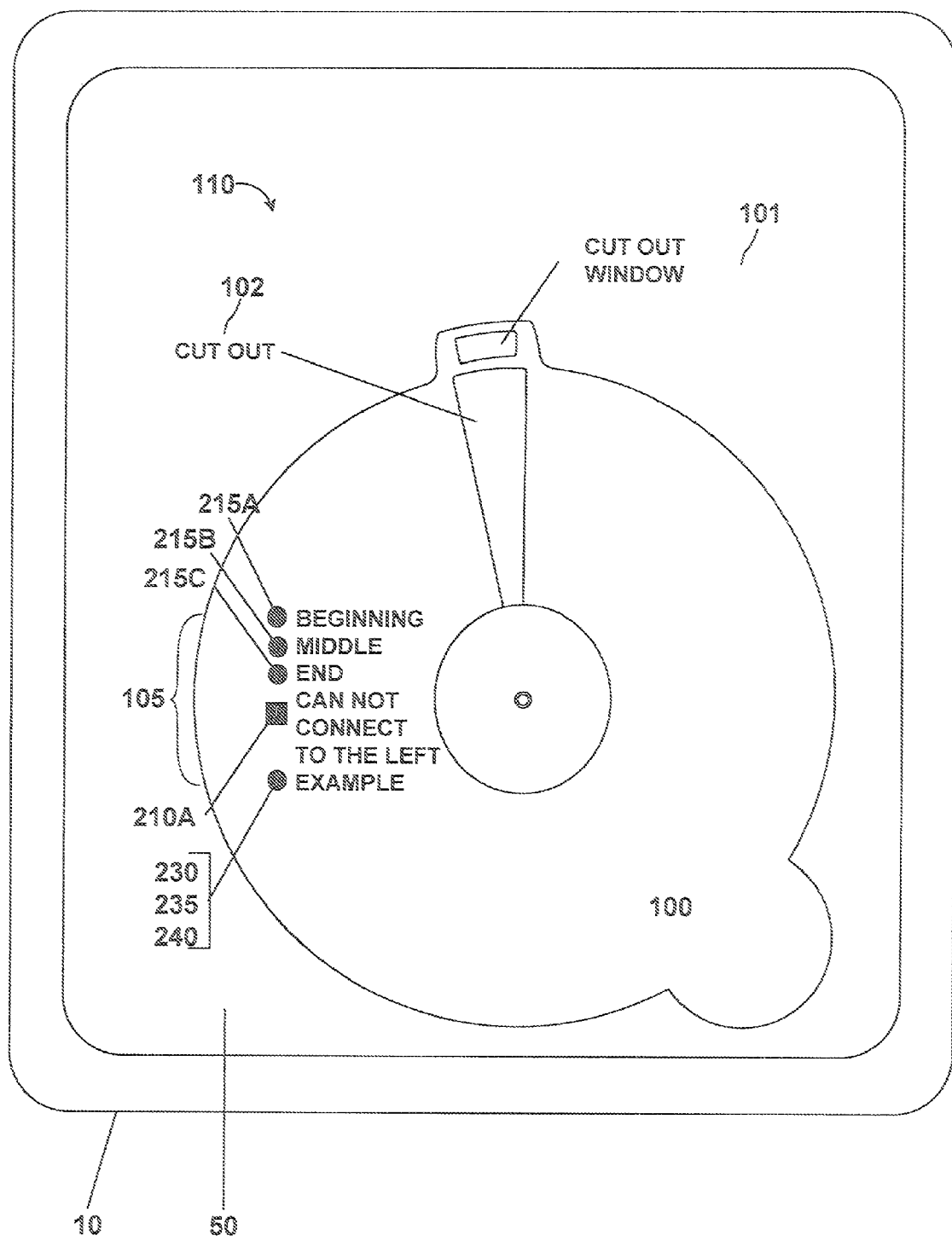
FIGS. 2-5 illustrate how a translation wheel may appear, according to an embodiment of the invention.

FIG. 2 illustrates a first layer 110 of an interactive wheel 100 for converting letters (e.g., English letters) into Arabic letters. Both the physical wheel embodiment and the computerized wheel embodiment may use this type of display. Latin-derived letter may be converted into Arabic letters. Latin derived letters may comprise letters from Latin-derived alphabets (e.g., the English alphabet, the French alphabet, the Spanish alphabet, the Italian alphabet, the Catalan alphabet, the Portuguese alphabet, the Romanian alphabet, or any other alphabet). It should be noted, that while English letters from the English alphabet are used, those of ordinary skill in the art will see that any type of letter (e.g., Latin-based, Russian, Chinese, etc.) may be converted into Arabic letters. Furthermore, any type of character or symbol may be converted into other types of characters or symbols according to the systems and methods in this disclosure. In computerized embodiments described herein, the wheel 100 may be generated by the display module 30. The first layer 110 may be displayed on the touchscreen 50 of the system 10 as shown. Physical and computerized versions of the first layer shown in FIG. 2 are discussed in more detail below.

Figure 3:
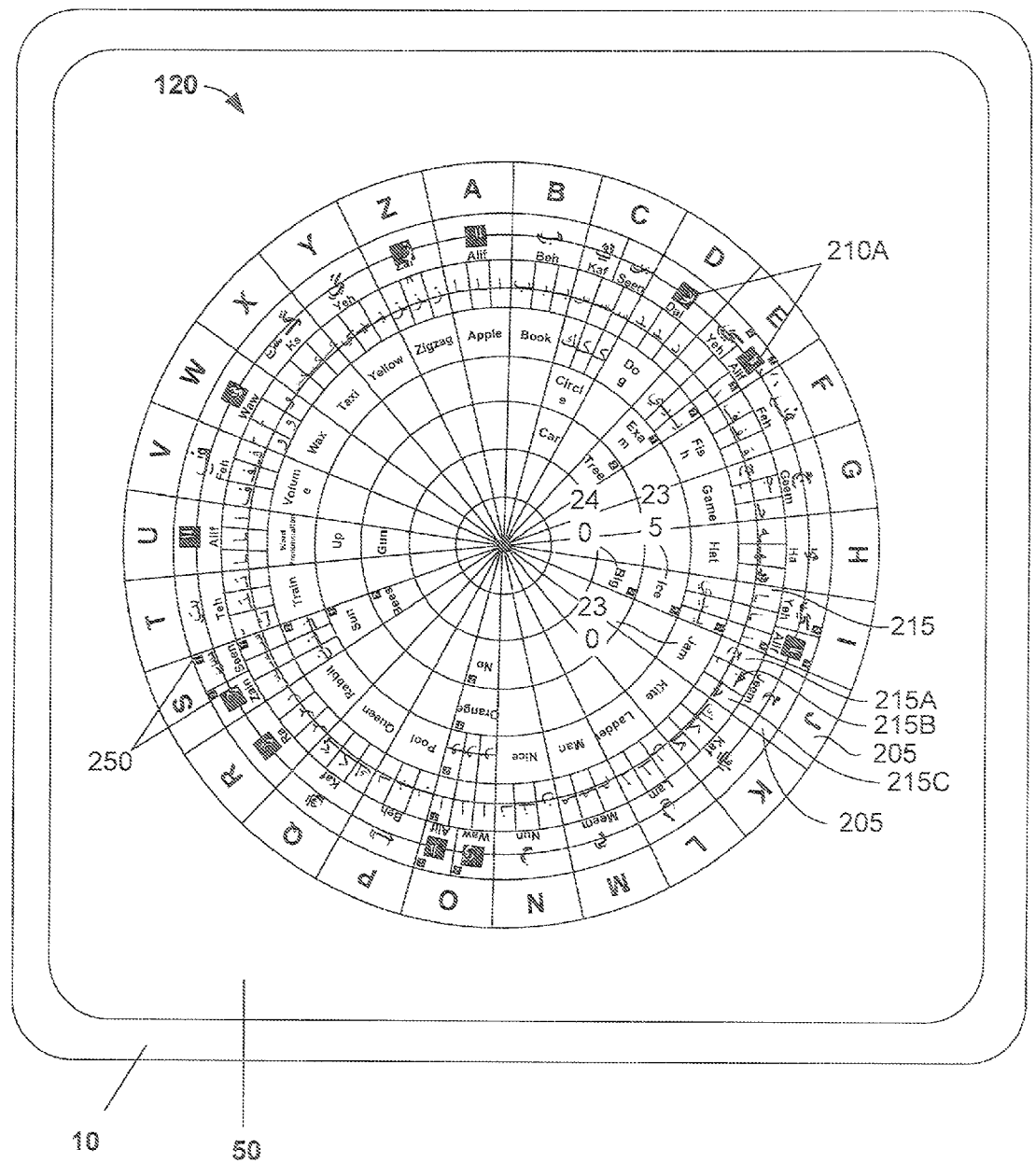

FIG. 3 illustrates the front of a second layer 120 of the wheel 110. Both the physical wheel embodiment and the computerized wheel embodiment may use this type of display. Circle 215 shows versions of each Arabic character. Versions of the letters may be shown in different ways, such as different colors. 215A may be the version of the Arabic letter used at the beginning of a word, 215B may be the version of the Arabic letter used in the middle of a word, and 215C may be the version of the Arabic letter used at the end of a word, for example. If an Arabic letter or part of an Arabic letter has a black box around it, as shown in 210A, this may signify that this Arabic letter cannot connect to the left. 230, 235 and 240 are examples of how the pronunciation is used in various words. These examples may be shown using color(s) in an embodiment. 230 is an example when one pronunciation is possible. 235 and 240 are examples when two pronunciations are possible. Physical and computerized versions of the first side of the second layer shown in FIG. 3 are discussed in more detail below.

Figure 4:
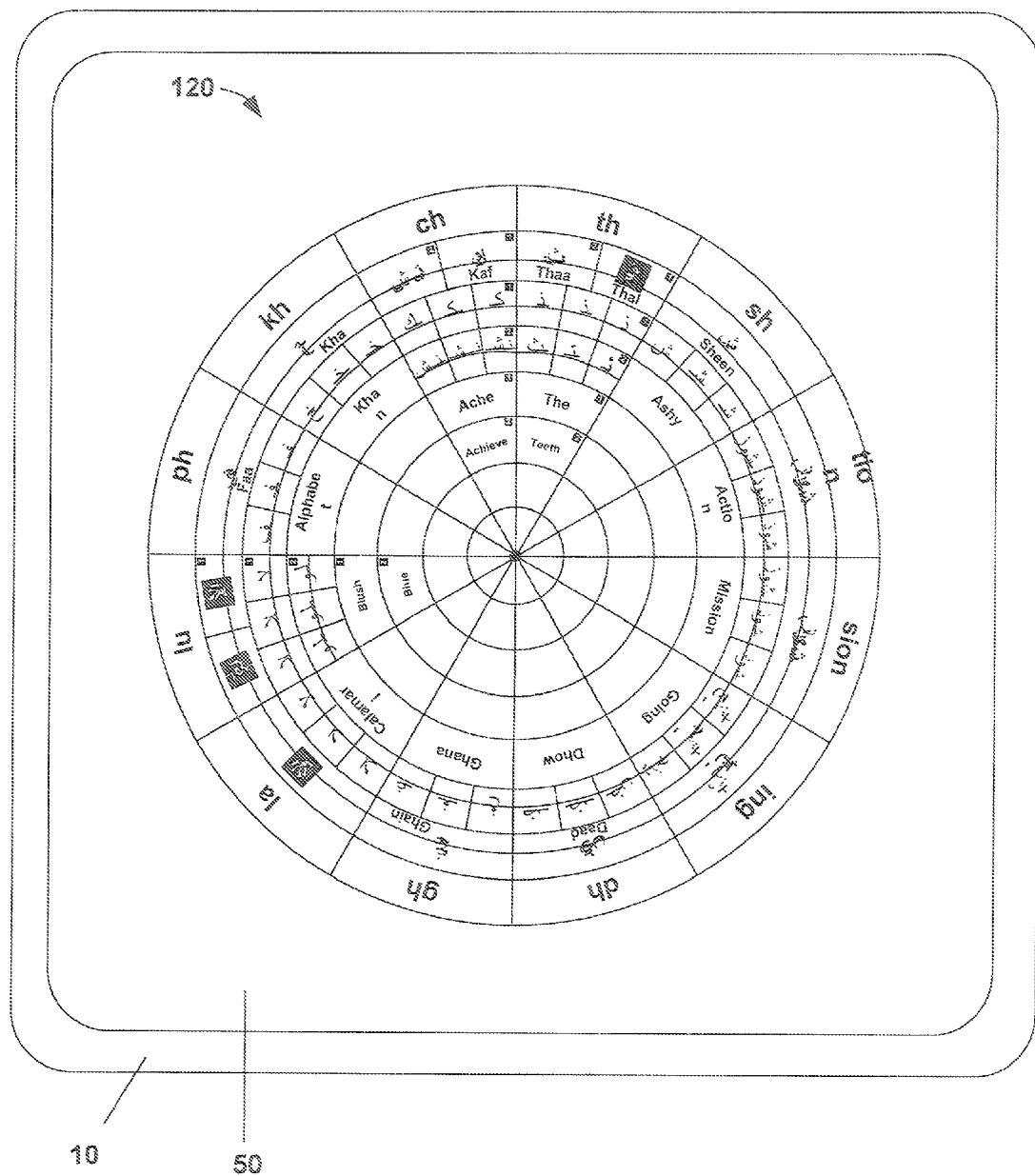

FIG. 4 illustrates the back of the second layer 120 of a system for converting letters into Arabic letters, according to an embodiment. Both the physical wheel embodiment and the computerized wheel embodiment may use this type of display. In this layer, common combinations of letters are converted into Arabic letters, following the process described in FIG. 3. In some computerized embodiments, a user may switch from the front of the second layer 120 to the back of the second layer 120 via a menu selection or command issued to the computer. In some computerized embodiments, common letter combinations may be displayed in some other manner, for example in a menu which may be displayed via a visual display 50 of a computer 10. Physical and computerized versions of the first side of the second layer shown in FIG. 4 are discussed in more detail below.

Figure 5:
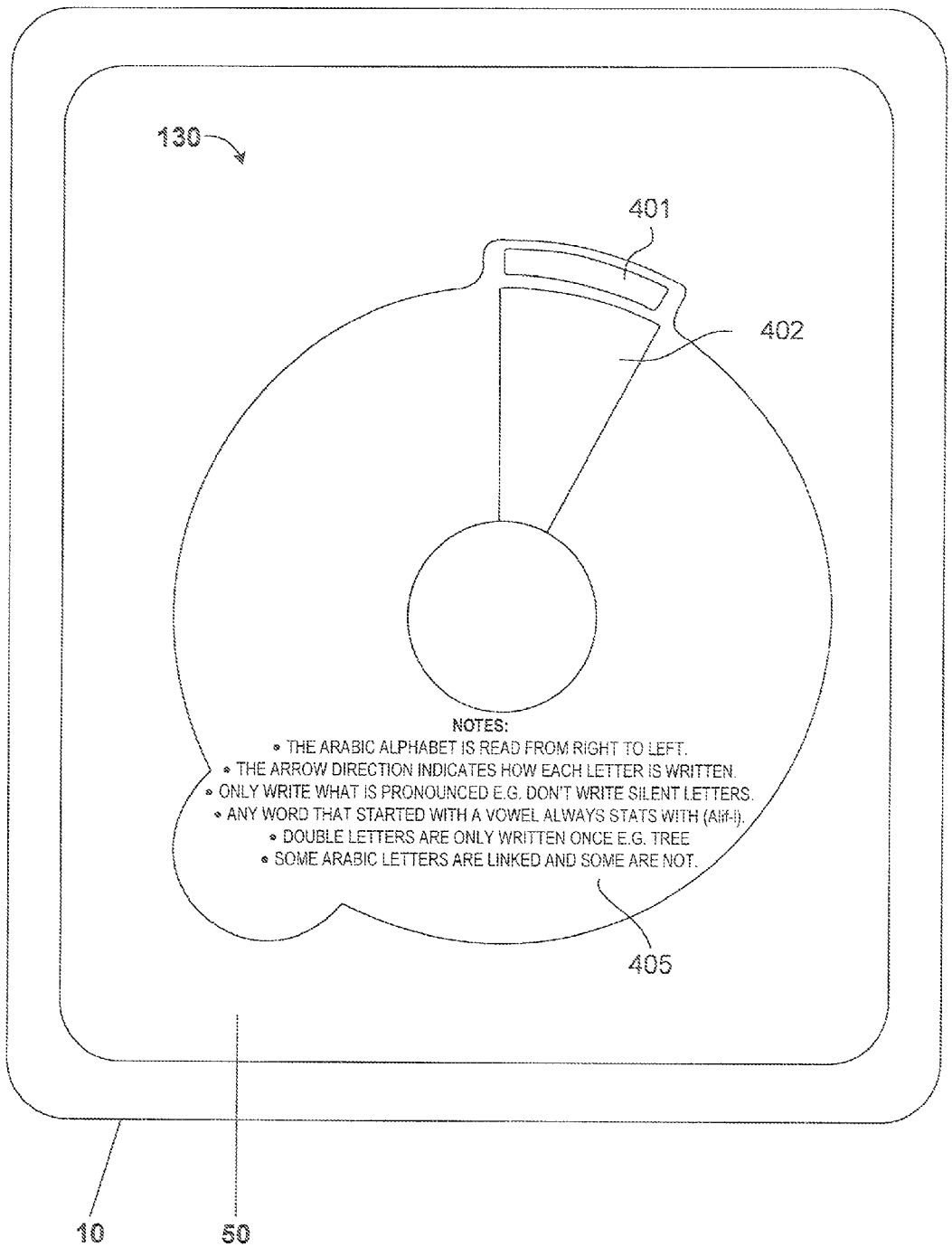
Figure 6A:
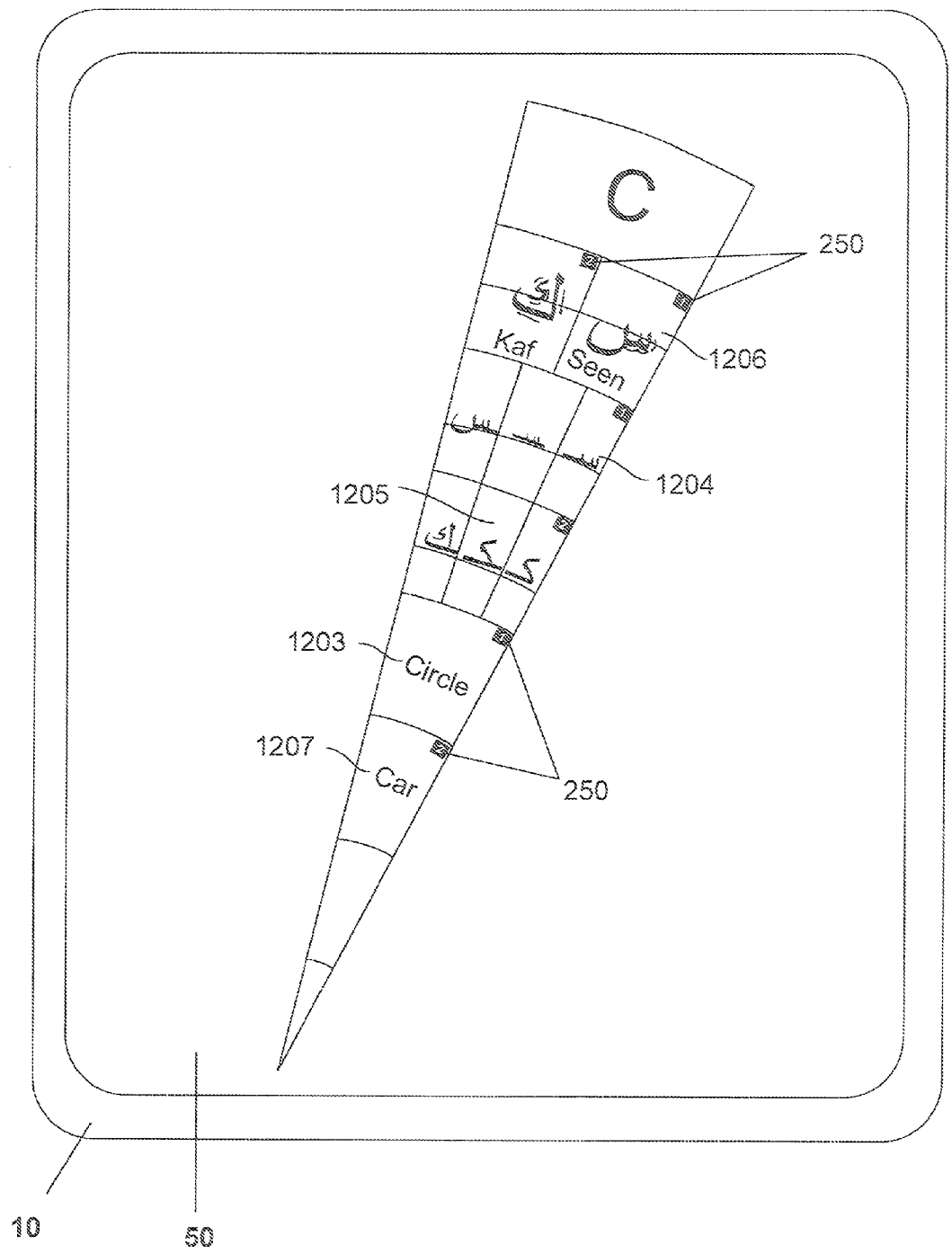
FIGS. 6A-6D illustrate an example use of the system, according to an embodiment of the invention.
Figure 6B:
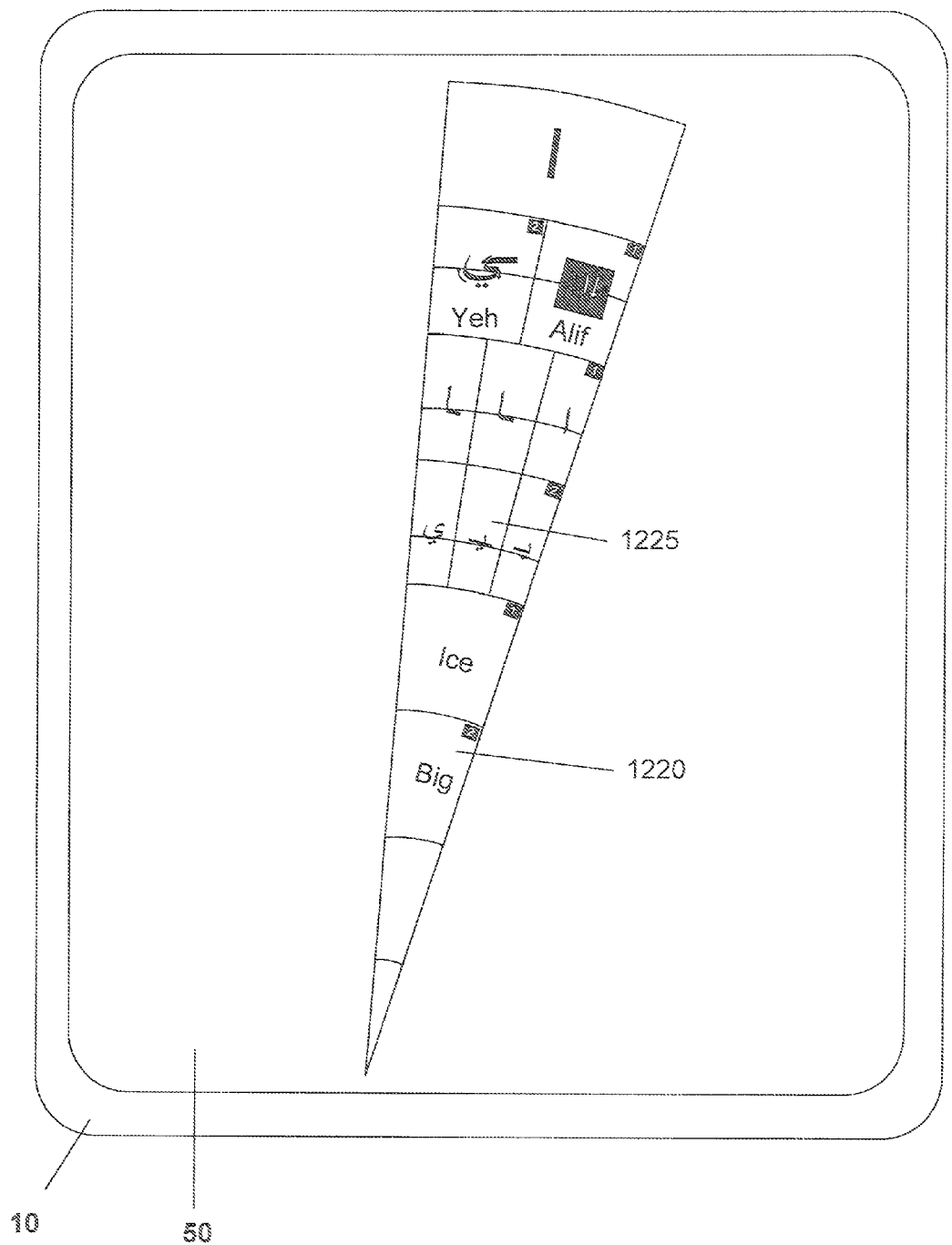
Figure 6C:
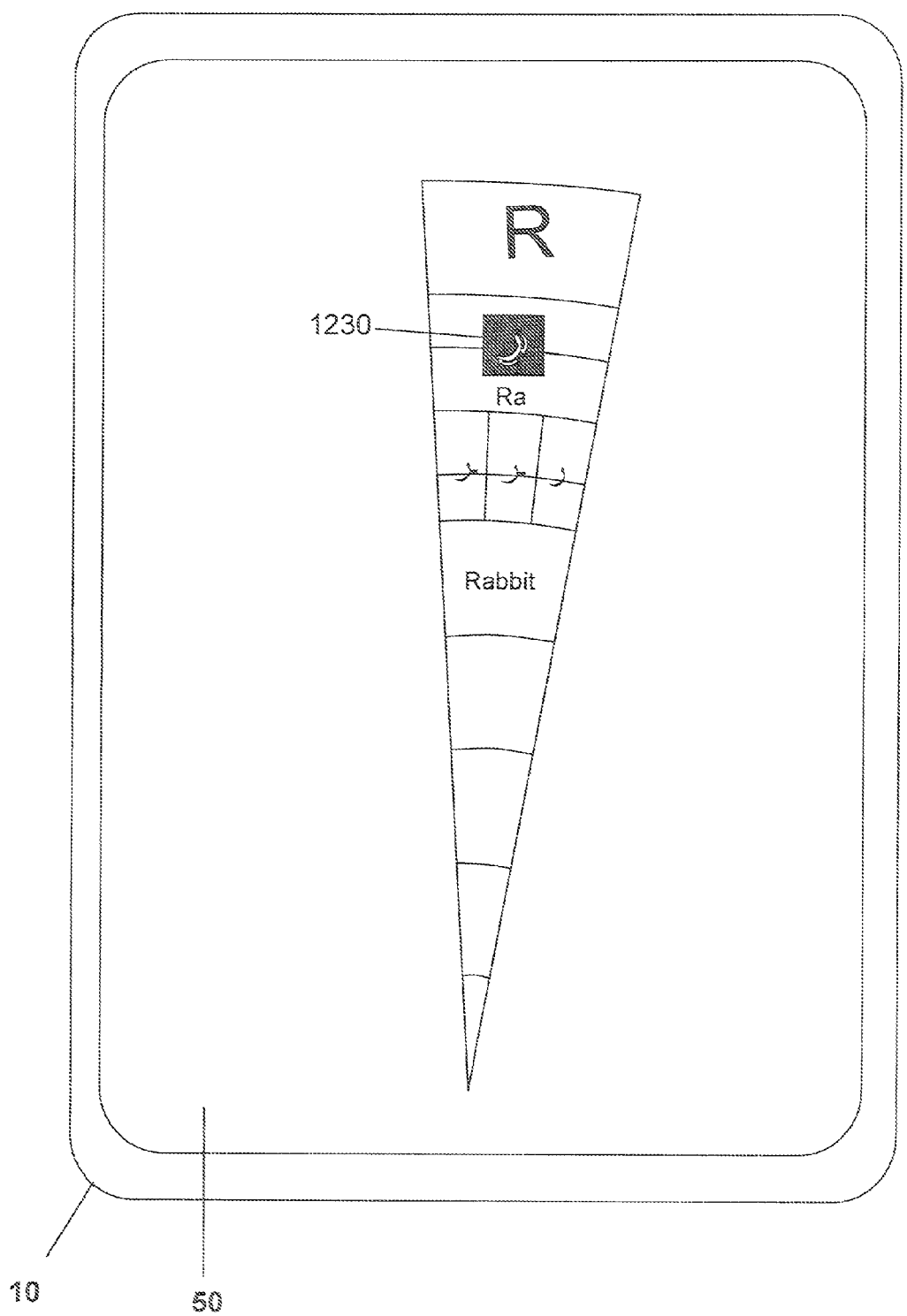
Figure 6D:
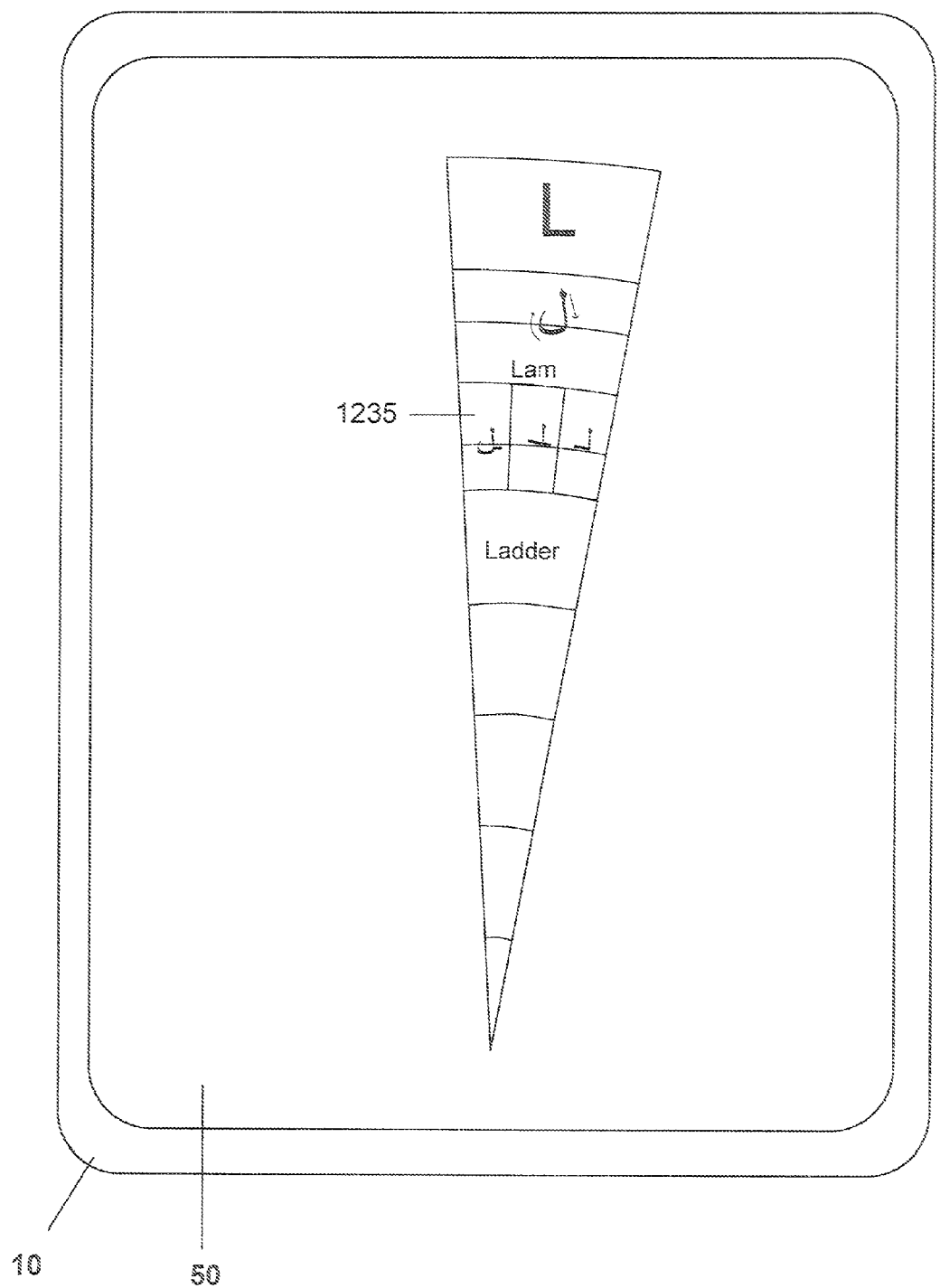

FIG. 5 illustrates a third layer 130 of wheel 100 for converting letters into Arabic letters. Both the physical wheel embodiment and the computerized wheel embodiment may use this type of display. A cut out window(s) may be generated to allow a user to see the back of second layer 120 (e.g., FIG. 4). In 401, a cut out window is illustrated where the back of second layer 120 may be shown. In 402, another cut out window may be used, where additional information on the back of second layer 120 may be shown. (Note that cut out windows 401 and 402 may be connected into one window or multiple additional windows may be used.) The cut out windows 401 and 402 may show visible content beneath the top layer and the bottom layer. When a user rotates layer 130 of wheel 100 (for example as described above), the content beneath the cut out area(s) is revealed. The process for finding which Arabic letter corresponds to the English letter described with respect to FIG. 3 may be utilized here as well. Physical and computerized versions of the first side of the second layer shown in FIG. 5 are discussed in more detail below.

Example of Physical Wheel Embodiment

FIGS. 2 and 10A-10G illustrate an example use of a physical version of the wheel 100, according to an embodiment of the invention.

FIG. 2 illustrates the front of a first layer of a physical translation wheel, according to an embodiment. Referring to FIG. 2, the first layer 110 may include a cut out window(s) that may allow a user to see the front of a second layer 120. In 101, a cut out window is illustrated where the front of second layer 120 may be shown. In 102, another cut out window may be used, where additional information on layer 120 may be shown. (Note that cut out windows 101 and 102 may be connected into one window or multiple additional windows may be used.) A user may rotate the first layer 110. When a user rotates the first layer 110 of wheel 100, content of the second layer 110 beneath the cut out area of the first layer 110 may be revealed. In 105, a legend may be provided which indicates which Arabic letter is to be used.

Figure 10A:
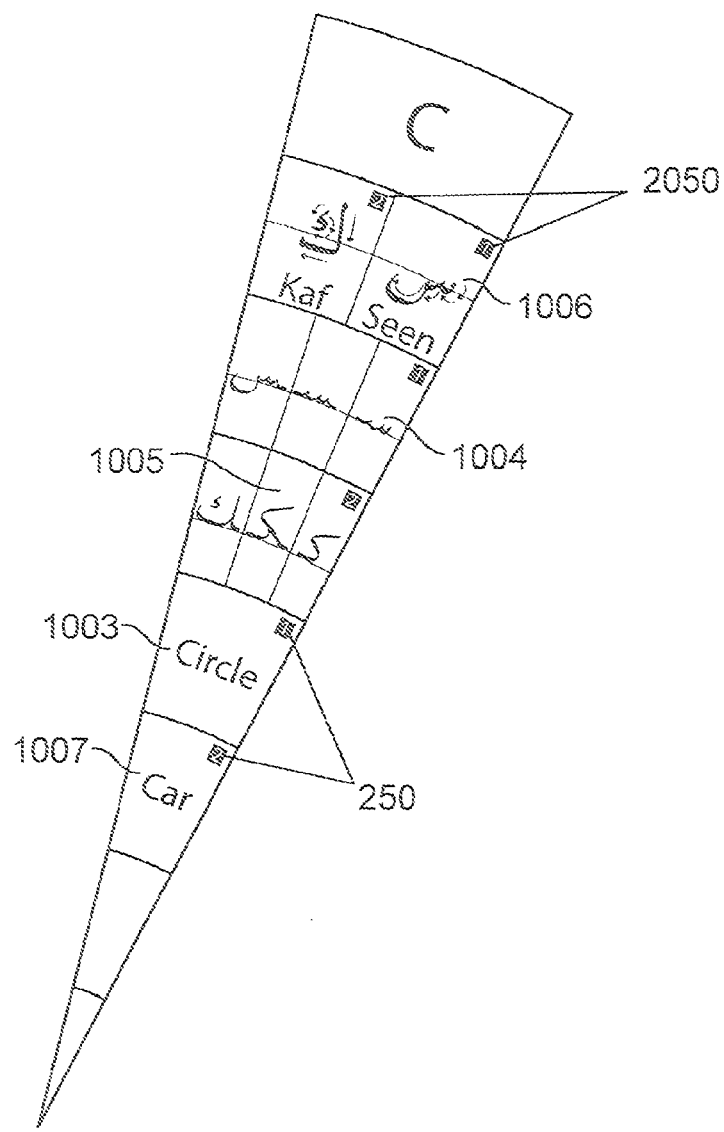
FIGS. 10A-10G illustrate an example use of a physical system, according, to an embodiment of the invention.
Figure 10B:
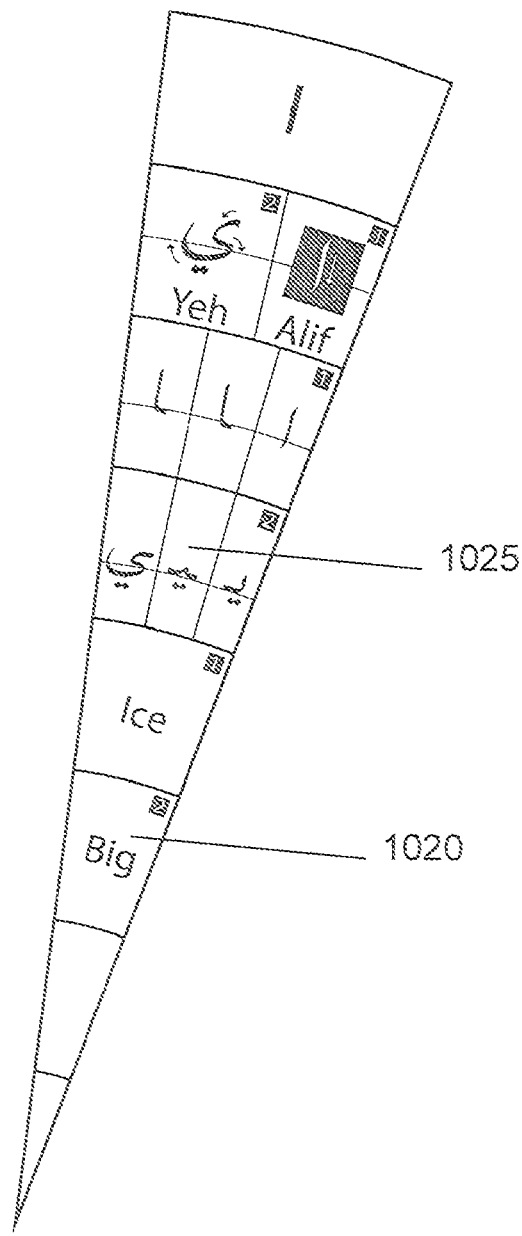
Figure 10C:
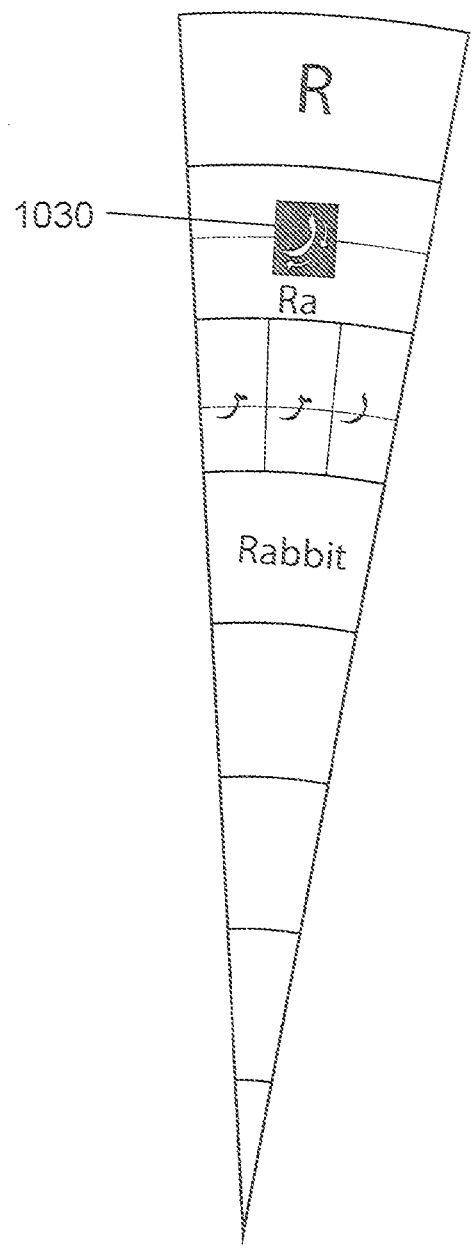
Figure 10D:
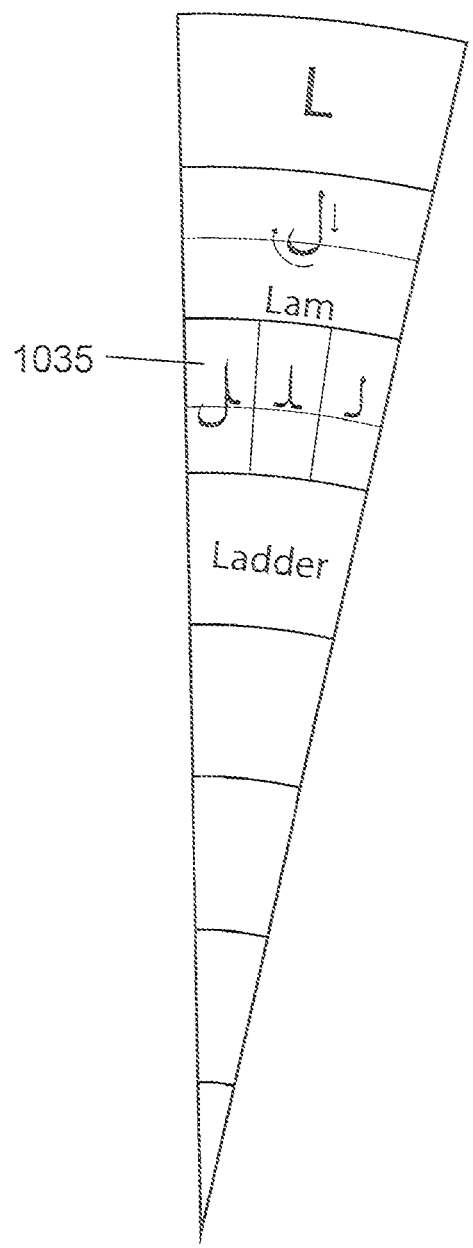
Figure 10E:
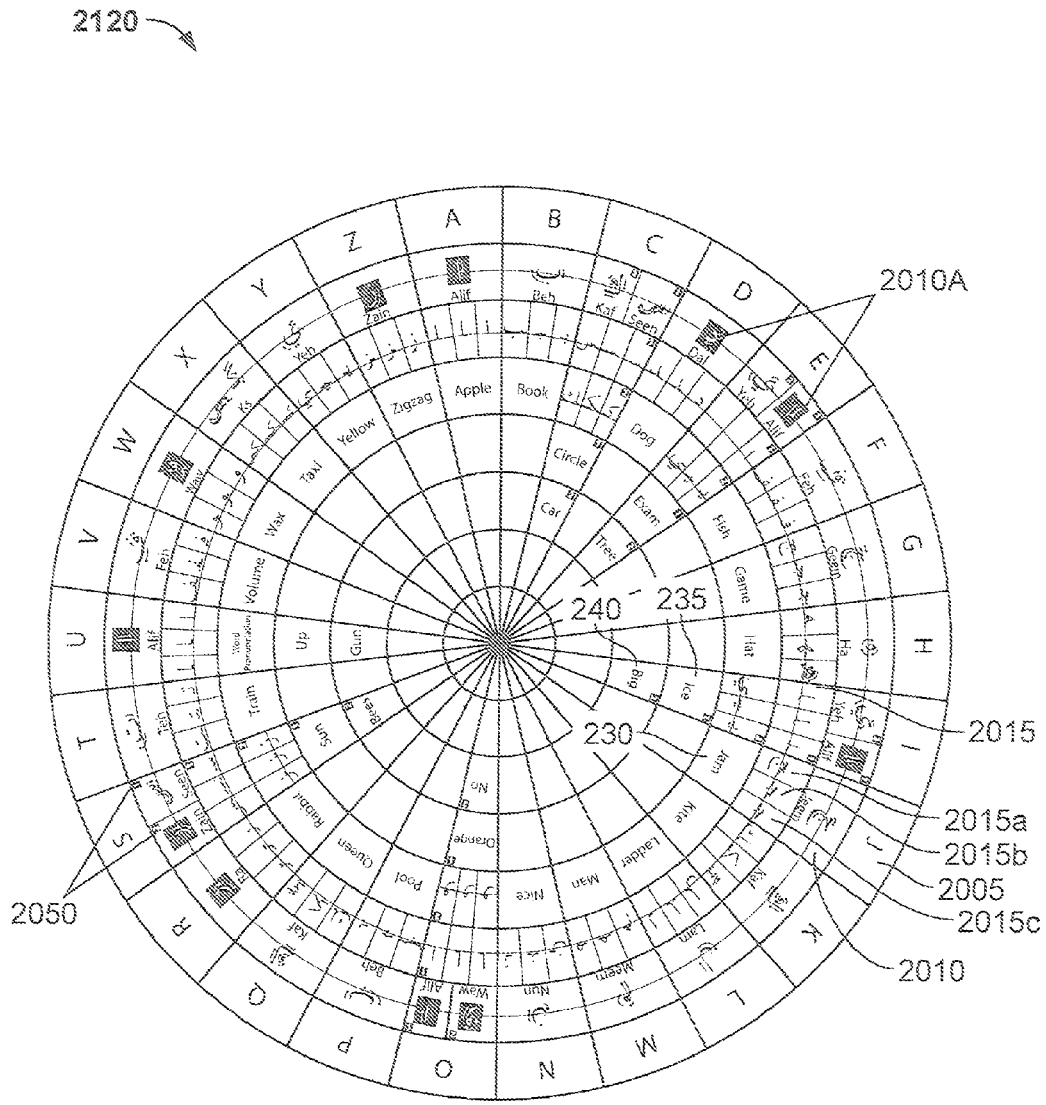

FIG. 10E illustrates the front of a second layer 2120 of a system for converting letters into Arabic letters. Circle 2015 shows versions of each Arabic letter. Versions of the letter may be shown in different ways, such as different colors. 2015A may be the version of the Arabic letter used at the beginning of a word, 2015B may be the version of the Arabic letter used in the middle of a word, and 2015C may be the version of the Arabic letter used at the end of a word. If an Arabic letter or part of an Arabic letter has a black box around it as shown in 2010A, this may signify that this Arabic letter cannot connect to the left. 2030, 2035 and 2040 are examples of how the sound is used in various words. These examples may be shown using color(s) in an embodiment. 203 is an example when one sound is possible. 2035 and 2040 are examples when two sounds are possible.

As shown in FIG. 10E, the circle 2005 illustrates various letters. In one embodiment, the entire English alphabet (e.g., A-Z) may be shown. The circle 2010 illustrates the corresponding Arabic letter with their Arabic name spelled underneath. The circle 2015 also shows how to write the Arabic letter. As mention above, various versions of the Arabic letter may be shown. Version 2015A may be used when the Arabic letter is at the beginning of a word. Version 2015E may be used when the Arabic letter is in the middle of a word. Version 2015C may be used when the Arabic letter is at the end of a word. As also noted above, circle 2030 may show examples of words that start with the corresponding letter and Arabic letter. Circle 2030 may also illustrate alternate Arabic letter, along with how the Arabic letter corresponding to a certain pronunciation is written at the beginning, middle, and end of a word. Identifier 2050 may identify alternate Arabic letter and pronunciations. For example, if circle 2030 includes an alternate Arabic letter, then circles 2035 and 2040 may provide examples of the respective pronunciations. If the Arabic letter can connect to the right, but cannot connect to the left, it may have a black box around it, as shown in 2010A. If such an Arabic letter is in the beginning or middle of an Arabic word, the black box around the symbol may signify that a mini space should be put before the next Arabic letter to the left. Thus, if there is a black box 2010A around an Arabic letter that corresponds to an English letter that is the last letter of an English word, this may signify that the last English letter should be written as an isolated Arabic letter. In some embodiments, silent English letters may be deleted (i.e., they do not need to be looked up into Arabic).

FIGS. 10A-10D illustrate an example use of the wheel 100, according to an embodiment. For the English word "circle", the following process may be used. (Note that while "circle" is written in English from left to write, the corresponding Arabic word will be written from right to left. Note also that the letters c, i, r, c, l will be written in Arabic, and not the word for circle in Arabic. Thus, for example, the wheel 100 may be useful for names or other proper nouns, in addition to teaching basic principles of Arabic.) 1) The "e" may be deleted because it is silent. 2) The user may turn to the "c" on the circle and choose whether the "c" is pronounced like the c in "car" or "circle". 3) Because the "c" is pronounced like the "c" in circle, the user may write down the Arabic letter that corresponds to the word "circle". In this case, the user may choose which pronunciation goes with which letter(s) by identifier 2050 in the various areas. For example, circle has a 1 for identifier 2050 in its area (e.g., 1003). Thus, the user would use the letter(s) also with a 1 (e.g., 1006) that should be used when the English letter is in the beginning of the word (e.g., 1004). 4) The user may then turn to the next English letter: "i". 5) The user may choose whether this "i" is pronounced like "ice" or "big". Because it is pronounced like "big" (e.g., 1020), the user may record the corresponding Arabic letter that should be used when the English letter is in the middle of the word (e.g., 1025). 6) The user may then turn to the "r". There is only one way to pronounce this English letter, so the user does not need to choose which pronunciation is appropriate. However, the Arabic symbol letter "r" has a black box around it (e.g., 1030). This means that it cannot be connected to the left, and thus a mini space should be put in before the next Arabic letter is written. 7) The user may then turn to the next English letter: "c" and choose whether this "c" is pronounced like the c in "car" or "circle". 8) As this "c" is pronounced like the "c" in "car", and this has a 2 in its area (e.g., see 1007), the user may use the letter(s) also with a 2 that should be used when the English letter is at the middle of the word (e.g., 1005). 9) The user may then turn to the final letter: "l". As there is only one pronunciation for this letter, the user may use the corresponding Arabic letter that should be used when the letter is at the end of the word (e.g., 1035). (Note that, because the silent "e" was cut off the English word "circle", "l" may be treated as a letter at the end of a word instead of the silent "e".)

Figure 10F:
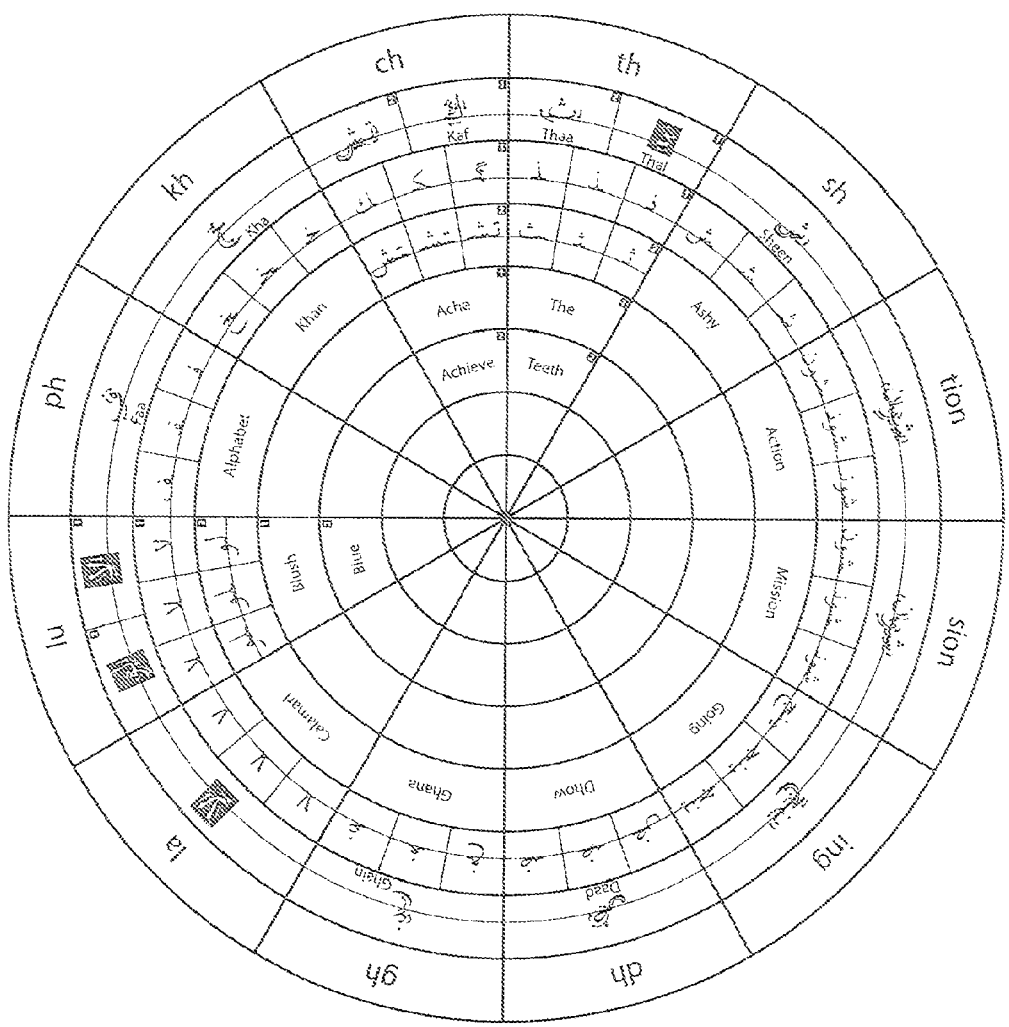

FIG. 10F illustrates the back of the second layer 2120 of a system for converting letters into Arabic letter, according to an embodiment. In this layer, common combinations of letters are converted into Arabic letter, following the process described in FIG. 10E.

Figure 10G:
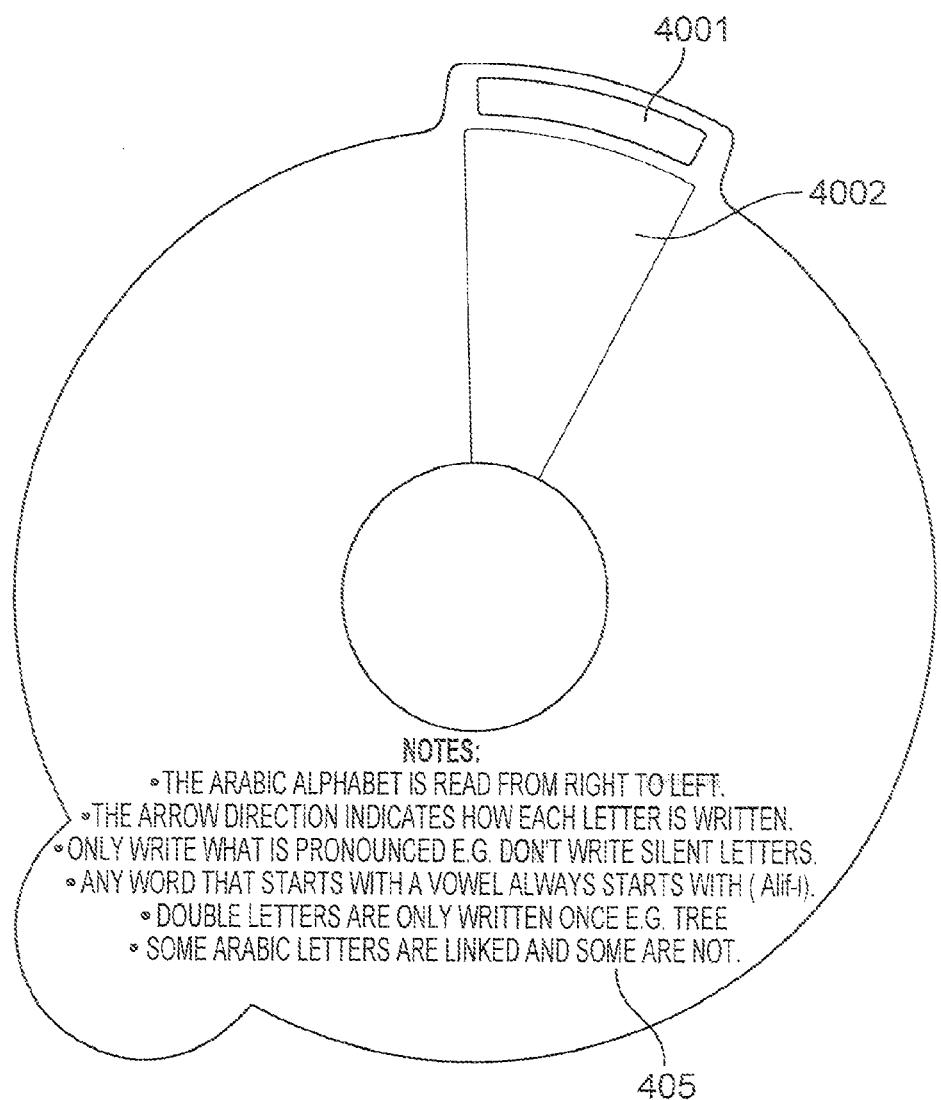

FIG. 10G illustrates a third layer 2130 of wheel 100 for converting letters into Arabic letter. A cut out window(s) may allow a user to see the back of second layer 2120 (e.g., FIG. 10F). In 4001, a cut out window is illustrated where the back of second layer 2120 may be shown. In 4002, another cut out window may be used, where additional information on the back of second layer 2120 may be shown. (Note that cut out windows 4001 and 4002 may be connected into one window or multiple additional windows may be used.) The cut out windows 4001 and 4002 may show visible content beneath the top layer and the bottom layer. When a user rotates layer 2130 of wheel 100, the content beneath the cut out area(s) is revealed. The process for finding which Arabic letter corresponds to the English letter described with respect to FIG. 10E may be utilized here as well.

Instructions or other information 4005 may be printed on layer 2130. These instructions may comprises the following: the Arabic alphabet is read from right to left; the arrow direction indicates how each letter is written; only write what is pronounced (e.g., don't write silent letters); any that starts with a vowel always starts with (Alif-l); double letters are only written once; or some Arabic letters are linked and some are not; or any combination thereof.

In an embodiment, layer 110 (e.g., FIG. 1) and the front of layer 2120 shown in FIG. 10E may be operated to convert single letters (e.g., A-Z) into Arabic letter. In an embodiment, layer 2130 of FIG. 10G and the back of layer 2120 of FIG. 10F may be operated to convert combinations of letters (e.g., into Arabic letter.

Example of Computer Wheel

Referring to FIG. 2, the first layer 110 may include a simulated cut out window(s) that may allow a user to see the front of a second layer 120. In 101, a cut out window is illustrated where the front of second layer 120 may be shown. In 102, another cut out window may be used, where additional information on layer 120 may be shown. (Note that cut out windows 101 and 102 may be connected into one window or multiple additional windows may be used.) A user may interact with the computer to rotate the first layer 110. For example, the computer may be a mobile device comprising a touch screen, such as an Android or iOS device. The user may swipe the screen 50 with a finger in a direction in which the first layer 110 is to be rotated. For example, a user may swipe left to right to cause the first layer 110 to rotate in a clockwise direction or right to left to cause the first layer 110 to rotate in a counterclockwise direction. In this example, the user may interact with the screen 50, the UI module 40 may receive this interaction, and the display module 30 may cause the information being displayed to change in response. When a user rotates the first layer 110 of wheel 100, content of the second layer 110 beneath the cut out area of the first layer 110 may be revealed. In 105, a legend may be provided which indicates which Arabic letter is to be used.

As shown in FIG. 3 the circle 205 illustrates various letters. In one embodiment, the entire English alphabet (e.g., A-Z) may be shown. The circle 210 illustrates the corresponding Arabic letters with their Arabic name spelled underneath. The circle 215 also shows how to write the Arabic letter. As mention above, various versions of the Arabic letter may be shown. Version 215A may be used when the Arabic letter is at the beginning of a word. Version 215B may be used when the Arabic letter is in the middle of a word. Version 215C may be used when the Arabic letter is at the end of a word. As also noted above, circle 230 may show examples of words that start with the corresponding letter and Arabic letter. Circle 230 may also illustrate alternate Arabic letters, along with how the Arabic letter corresponding to a certain pronunciation is written at the beginning, middle, and end of a word. Identifier 250 may identify alternate Arabic letters and pronunciations. For example, if circle 230 includes an alternate Arabic letter, then circles 235 and 240 may provide examples of the respective pronunciations. If the Arabic letter can connect to the right, but cannot connect to the left, it may have a black box around it, as shown in 210A. If such an Arabic letter is in the beginning or middle of an Arabic word, the black box around the letter may signify that a mini space should be put before the next Arabic letter to the left. Thus, if there is a black box 210A around an Arabic letter that corresponds to an English letter that is the last letter of an English word, this may signify that the last English letter should be written as an isolated Arabic letter. In some embodiments, silent English letters may be deleted (i.e., they do not need to be looked up into Arabic).

Clicking, tapping, or otherwise selecting an Arabic letter using the system 10 may cause the system 10 to play a sound corresponding to the selected Arabic letter. For example, tapping an Arabic letter on the touchscreen 50 of a mobile device may cause a speaker 60 embedded in the mobile device to emit a prerecorded spoken sample of the pronunciation associated with the Arabic letter. The Latin letters may also be selectable in some embodiments, so that a sound may be played when a Latin letter is selected as well.

Figure 9A:
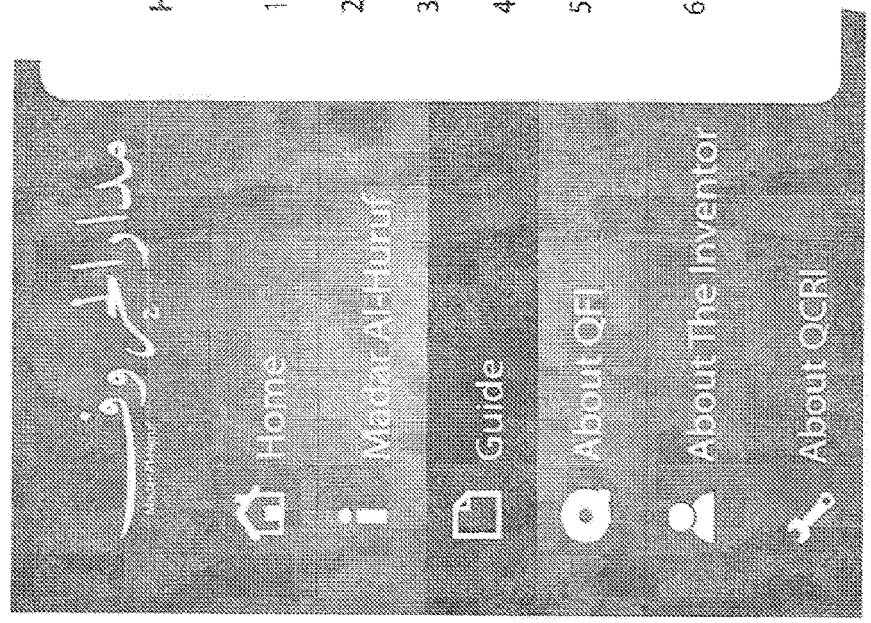
Figure 9B:
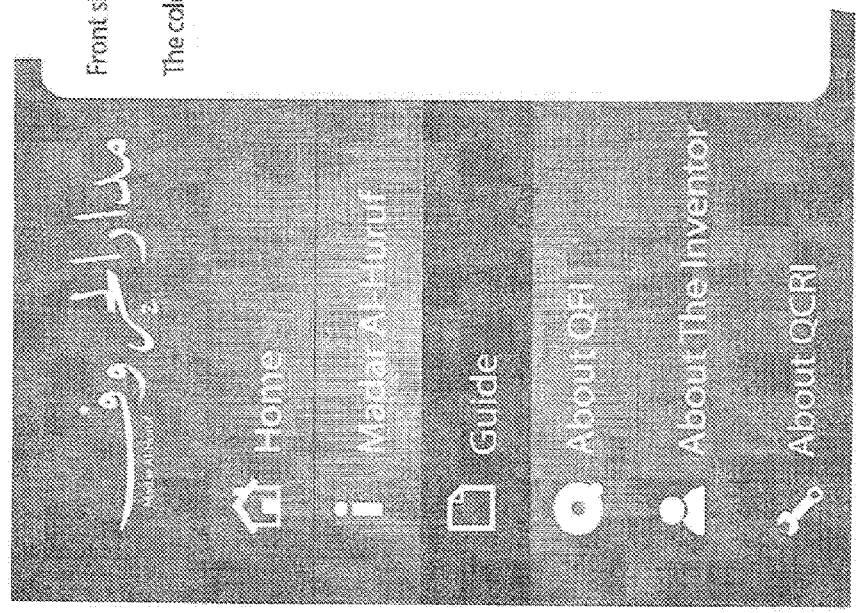
Figure 9D:
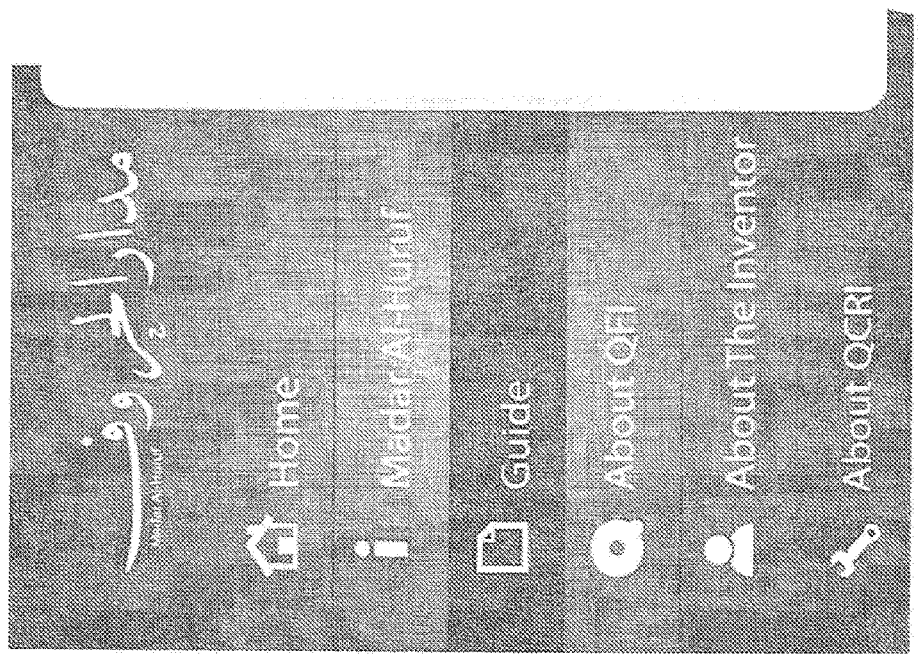
Figure 9E:
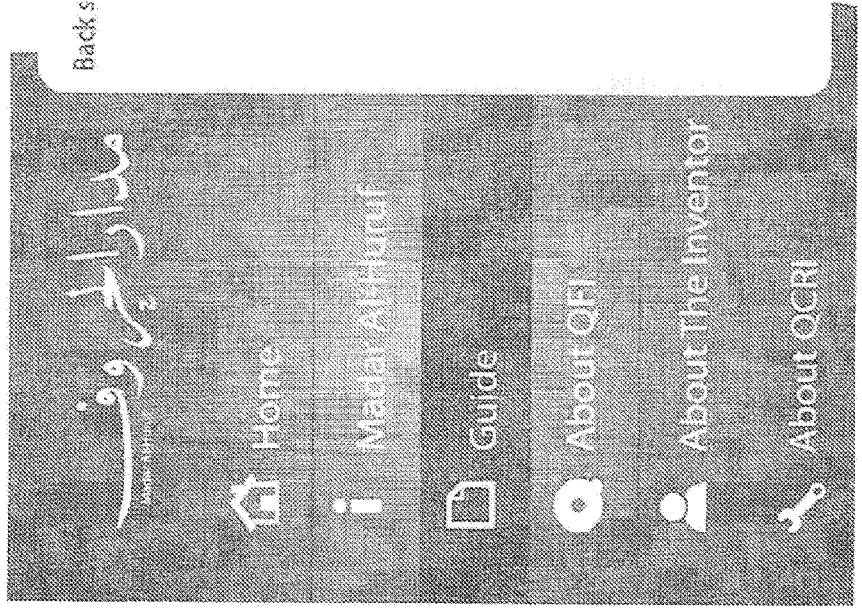
Figure 9F:
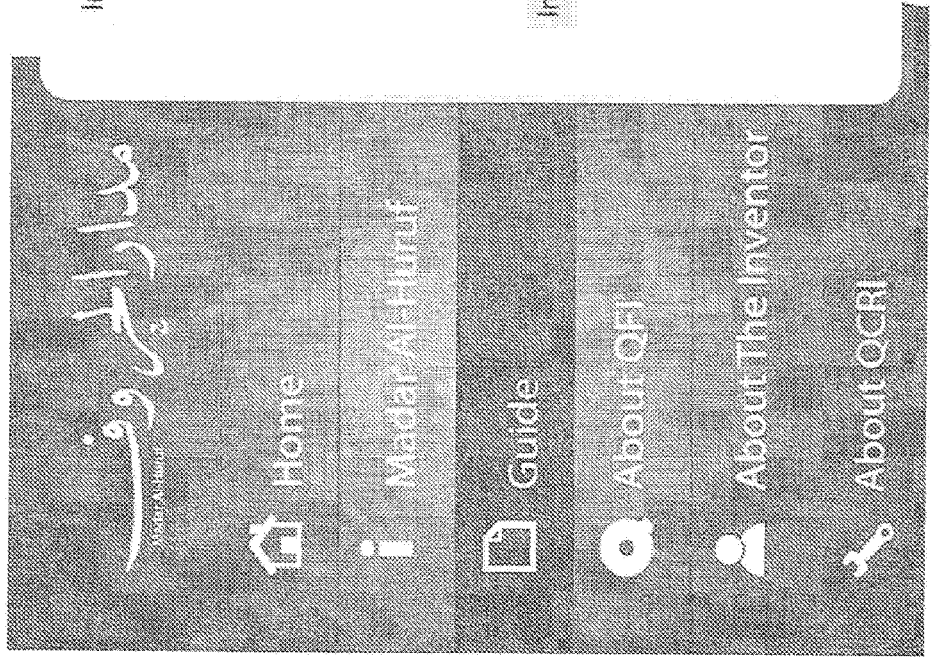

FIGS. 9A-9G illustrate example guide 900 screenshots, according to an embodiment of the invention. The system 10 may include a guide 900, which may include information about how the system 10 is operated and/or about the Arabic language generally. In some embodiments, the guide 900 may be displayed the first time a user operates the system 10. The guide 900 may also be accessible via a menu or selection in the user interface. The guide 900 may present data on a series of screens, on a single scrollable screen, or in any other suitable format. In the embodiment of FIGS. 9A-9G, each figure represents one of a series of screens, which a user may sort through by swiping or tapping a touch screen. For example, FIG. 9A illustrates a set of general instructions for operating the wheel 100. FIGS. 9B-9D illustrate instructions for using a front (or first) side of the wheel 100. FIG. 9E illustrates instructions for using a back (or second) side of the wheel 100. FIGS. 9F-9G illustrate instructions for choosing Arabic letters using the wheel 100 according to Arabic grammar rules. The guide 900 is discussed in greater detail below in the context of an example use of the system 10.

FIGS. 6A-6D illustrate an example use of the system 10, according to an embodiment. For the English word "circle", the following process may be used. (Note that while "circle" is written in English from left to right, the corresponding Arabic word will be written from right to left. Note also that the letters c, i, r, c, l will be written in Arabic, and not the word for circle in Arabic. Thus, for example, the wheel 100 may be useful for names or other proper nouns, in addition to teaching basic principles of Arabic.) 1) The "e" may be deleted because it is silent. The user may determine which letters are to be deleted using the guide 900, which may include information about which letters are silent in various scenarios according to Arabic grammar rules. 2) The user may choose the "c" on the circle and choose whether the "c"

pronunciation is like the c in "car" or "circle". 3) Because the "c" pronunciation is like the "c" in circle, the user may select the Arabic letter that corresponds to the word "circle". In this case, the user may determine which pronunciation goes with which letter(s) by identifier 250 in the various areas. The meanings of the identifiers 250 may be provided in the guide 900. For example, circle has a 1 for identifier 250 in its area (e.g., 1203). Thus, the user would use the letter(s) also with a 1 (e.g., 1206) that should be used when the English letter is in the beginning of the word (e.g., 1204). The computer 10 may receive this selection and perform one or more lookups in one or more lookup tables for corresponding data, such as associated Arabic letters, pronunciations, or other information described above. 4) The user may then choose the next English letter: "i". 5) The user may choose whether this "i" is pronounced like "ice" or "big". Because it is pronounced like "big" (e.g., 1220), the user may select the corresponding Arabic letter that should be used when the English letter is in the middle of the word (e.g., 1225). Information regarding which Arabic letter should be used in this scenario may be found in the guide 900. The computer 10 may receive this selection and perform one or more lookups in one or more lookup tables for corresponding data, such as associated Arabic letters, pronunciations, or other information described above. 6) The user may then choose the "r". There is only one way to pronounce this English letter, so the user does not need to choose which pronunciation is appropriate. However, the Arabic letter for "r" has a black box around it (e.g., 1230). This means that it cannot be connected to the left, and thus a mini space should be put in before the next Arabic letter is written. In some embodiments, the meaning of the black box may be explained in the guide 900. The guide 900 itself may also explicitly explain the grammar rules, so that a user who has read the guide may know that the "r" cannot be connected to the left, for example. The computer 10 may receive the selection and perform one or more lookups in one or more lookup tables for corresponding data, such as associated Arabic letters, pronunciations, or other information described above. In this case, the information in the table may reveal that "r" cannot be connected to the left, for example. 7) The user may then choose the next English letter: "c" and choose whether this "c" pronunciation is like the c in "car" or "circle". 8) As this "c" pronunciation is like the "c" in "car", and this has a 2 in its area (e.g., see 1207), the user may select the letter(s) also with a 2 that should be used when the English letter is at the middle of the word (e.g., 1205). This information may be available in the guide 900, as discussed above. The computer 10 may receive this selection and perform one or more lookups in one or more lookup tables for corresponding data, such as associated Arabic letters, pronunciations, or other information described above. 9) The user may then turn to the final letter: "l". As there is only one pronunciation for this letter, the user may select the corresponding Arabic letter that should be used when the letter is at the end of the word (e.g., 1235). This information may be available in the guide 900, as discussed above. The computer 10 may receive this selection and perform one or more lookups in one or more lookup tables for corresponding data, such as associated Arabic letters, pronunciations, or other information described above. (Note that, because the silent "e" was cut off the English word "circle", "l" may be treated as a letter at the end of a word instead of the silent "e"). The user may select each of these letters, and the computer 10 may join them together appropriately and display the result. The result may be displayed graphically via a visual display. In some embodiments, the computer 10 may audibly pronounce each letter separately via a device speaker, for example using technology such as that provided by Qatar Computing Research Institute.

While the system may display correct choices for the user, in practice a user may attempt to combine Arabic letters in ways that violate Arabic grammar rules. In this event, the system may provide an indication that the user has selected an incorrect letter. Returning to the example described above, the system may display the Arabic letter for "r" with a black box around it at 1230. This means that it cannot be connected the left, and thus a mini space should be put in before the next Arabic letter is written. If the user attempts to select the Arabic letter for "r" without inserting a mini space (or attempts any erroneous selection), the system may provide an indication of the error. For example, the system may provide a visual indication (e.g., a flashing warning on the display), a tactile indication (e.g., a vibration if the computer 10 is equipped with a vibrating element), a pronunciation, or any other indication or combination thereof.

FIG. 4 illustrates the "back" of the second layer 120 of a system for converting letters into Arabic letters, according to an embodiment. In this layer, common combinations of letters are converted into Arabic letters, following the process described in FIG. 3. A user may switch from the front of the second layer 120 to the back of the second layer 120 via a menu selection or command issued to the computer. In some embodiments, common letter combinations may be displayed in some other manner, for example in a menu which may be displayed via a visual display 50 of a computer 10.

FIG. 5 illustrates a third layer 130 of wheel 100 for converting letters into Arabic letters. A cut out window(s) may be generated to allow a user to see the back of second layer 120 (e.g. FIG. 4). In 401, a cut out window is illustrated where the back of second layer 120 may be shown. In 402, another cut out window may be used, where additional information on the back of second layer 120 may be shown. (Note that cut out windows 401 and 402 may be connected into one window or multiple additional windows may be used.) The cut out windows 401 and 402 may show visible content beneath the top layer and the bottom layer. When a user rotates layer 130 of wheel 100 (for example as described above), the content beneath the cut out area(s) is revealed. The process for finding which Arabic letter corresponds to the English letter described with respect to FIG. 3 may be utilized here as well.

Instructions or other information 405 may be displayed on layer 130. These instructions may comprise the following: the Arabic alphabet is read from right to left; the arrow direction indicates how each letter is written; only write what is pronounced (e.g., don't write silent letters); any word that starts with a vowel always starts with (Alif-l); double letters are only written once; or some Arabic letters are linked and some are not; or any combination thereof. In some embodiments, this information 405 may be presented in other contexts, e.g., a help file or instructions page.

In an embodiment, layer 110 (e.g., FIG. 2) and the front of layer 120 shown in FIG. 3 may be operated to convert single letters (e.g., A-Z) into Arabic letters. In an embodiment, layer 130 of FIG. 5 and the back of layer 120 of FIG. 4 may be operated to convert combinations of letters (e.g., LU, PH), into Arabic letters.

Additional Example of Computer Wheel

Figure 7A:
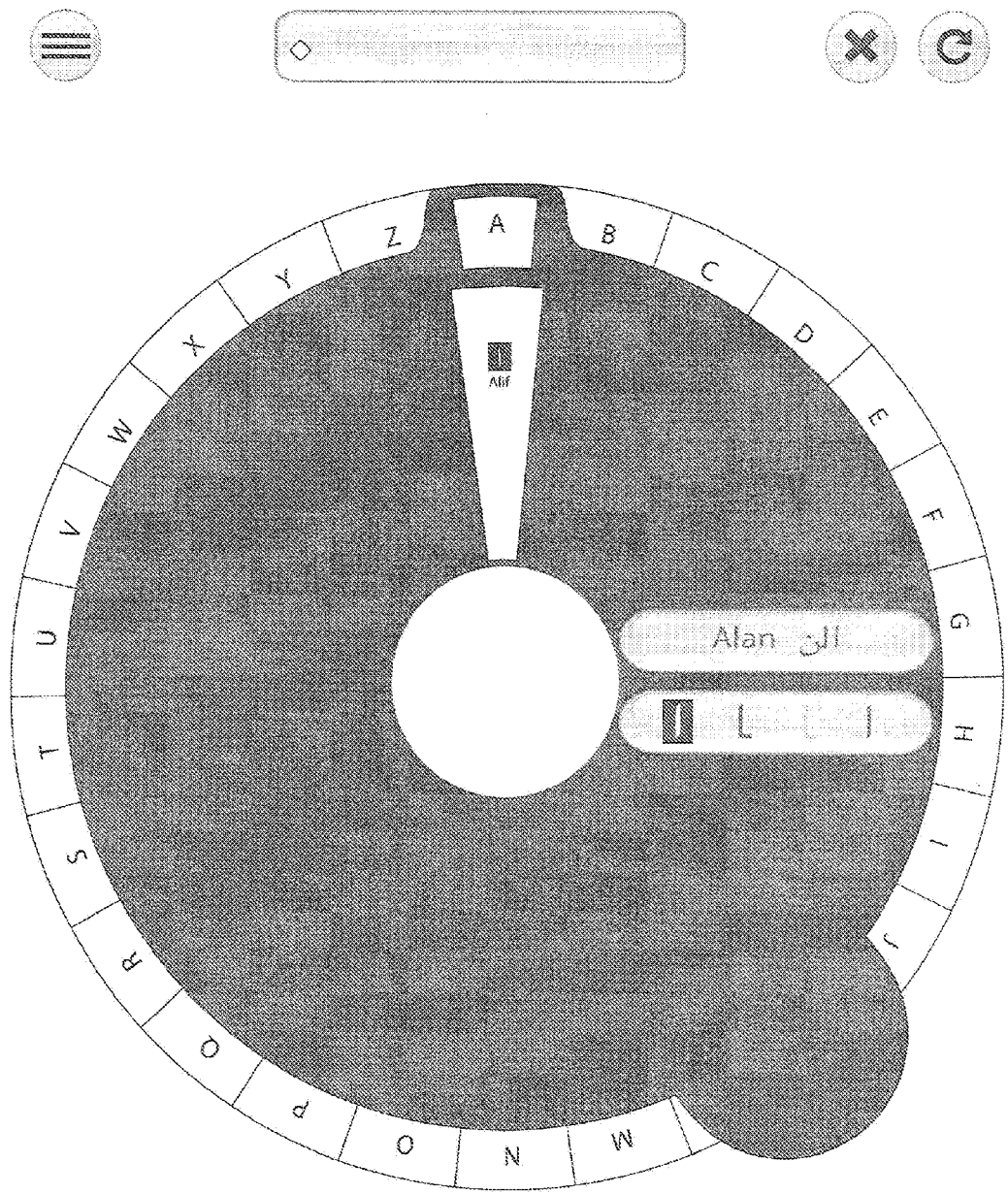
Figure 7B:
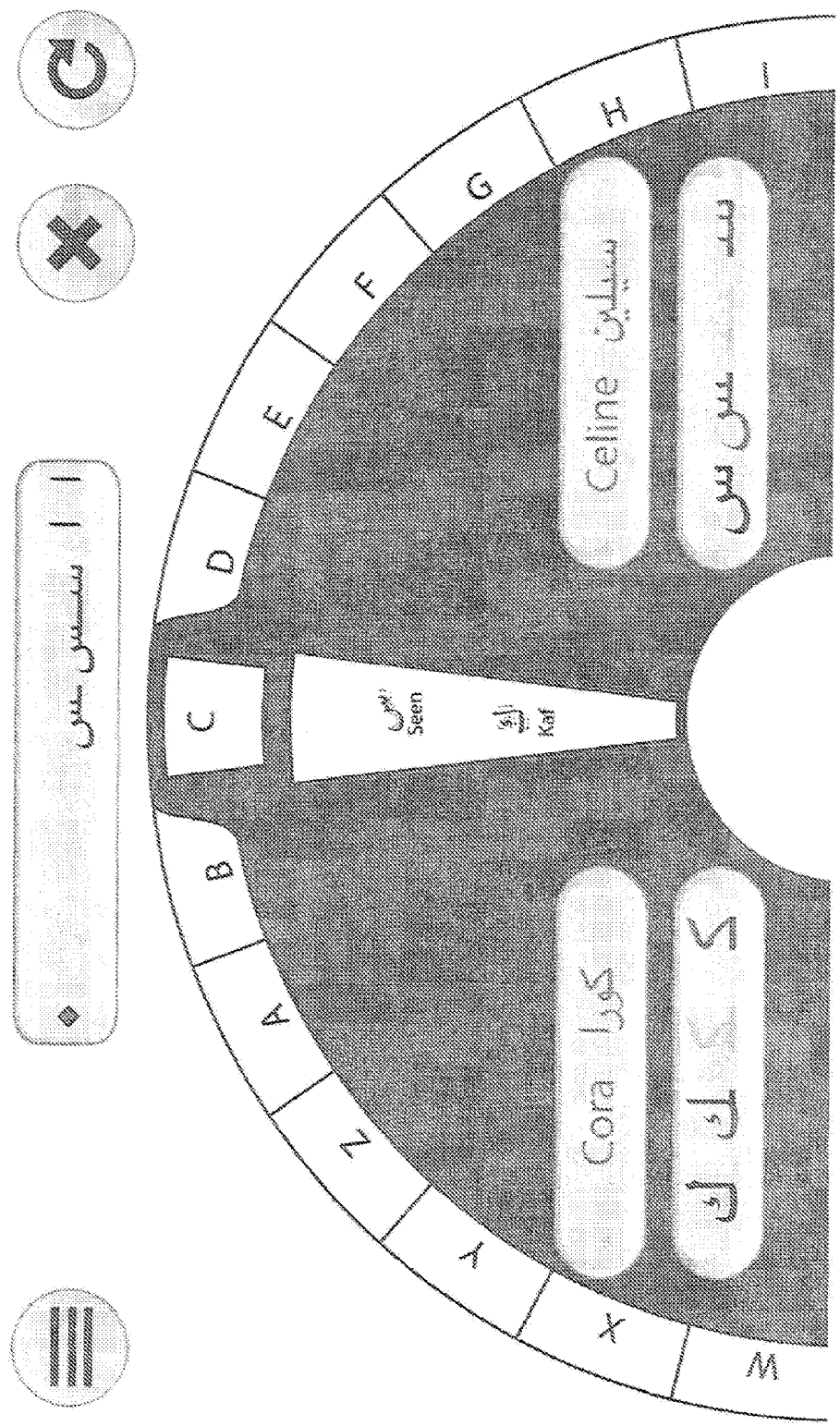
Figure 7C:
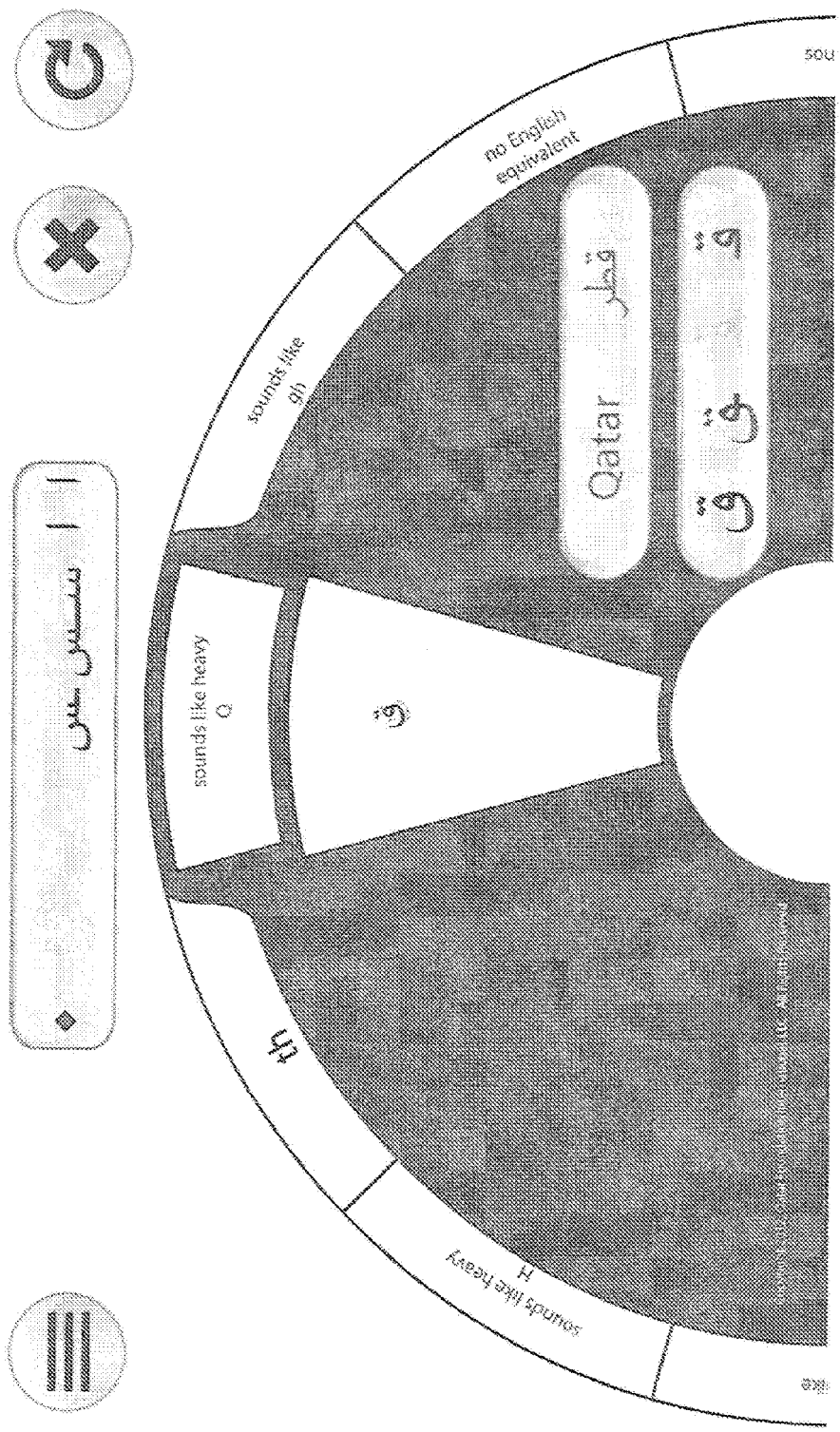
Figure 7F:
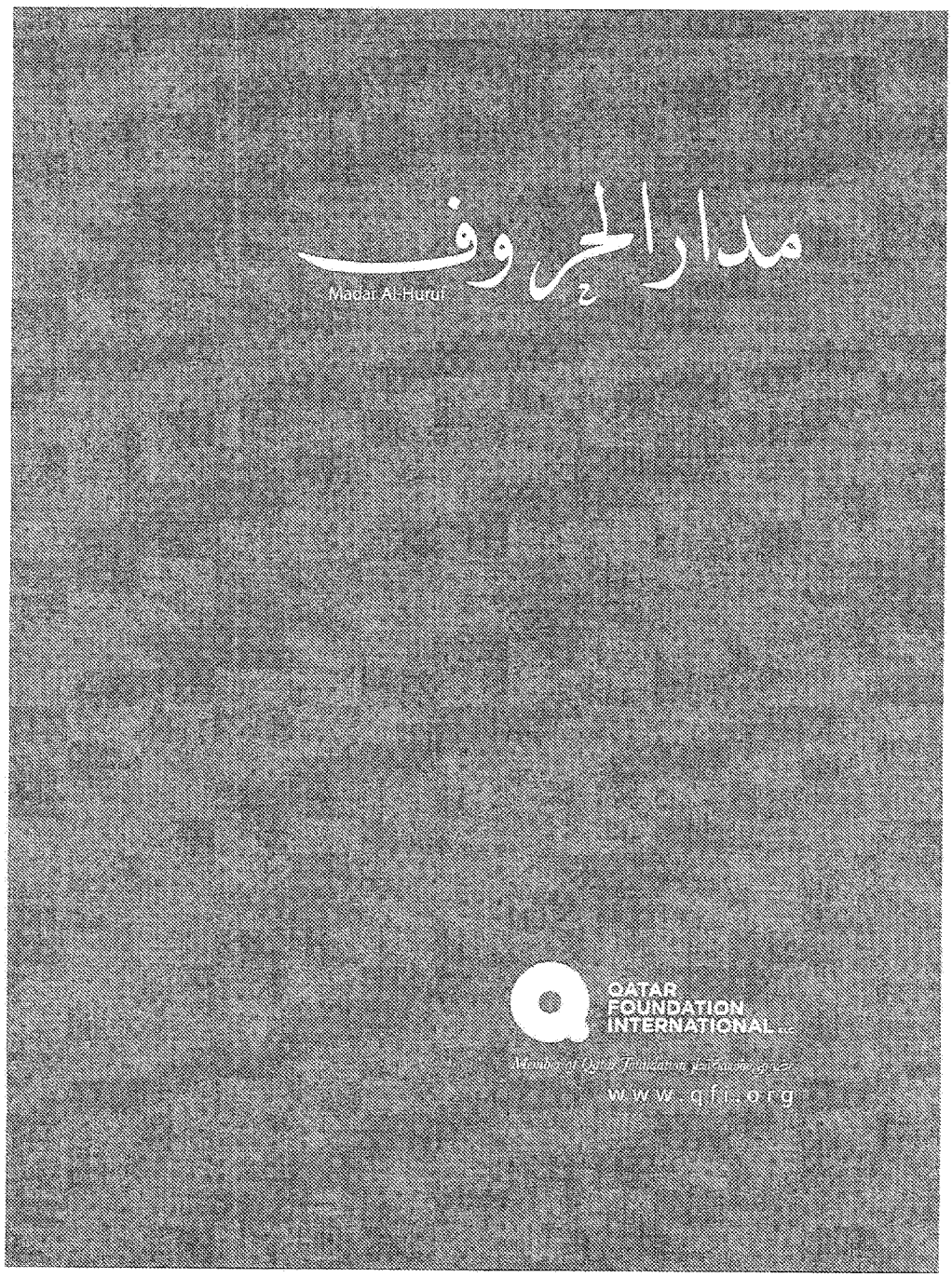

FIGS. 7A-7F are example screenshots of the translation wheel 100 in an iOS environment. In FIG. 7A, the first layer 110 is overlaid onto the second layer 120 so that the letter "A" appears in cut out window 101 and "Alif" appears in cut out window 102. The wheel 100 may be operated in this environment as described above. The user may turn to the "A" on the circle, and a button corresponding to the pronunciation of "A" may be shown (e.g., the button illustrating the Arabic letter and an English usage as a pronunciation example). The user may select this letter by clicking the button. The computer 10 may receive this selection and perform one or more lookups in one or more lookup tables for corresponding data, such as associated Arabic letters, pronunciations, or other information described above. For example. "Alif" is shown on the screen beneath the "A" as the corresponding Arabic letter. The user may scroll (e.g., rotate) to the next letter and continue the process as described above. FIG. 7B shows another example wherein the user has turned to the letter "C" on the circle. In this case, the "C" may have two different pronunciations, and separate buttons are shown with pronunciation examples (e.g., a hard or soft pronunciation) and corresponding Arabic letters. The user may select the letter corresponding to the pronunciation of their choice by clicking the button. The computer 10 may receive this selection and perform one or more lookups in one or more lookup tables for corresponding data, such as associated Arabic letters, pronunciations, or other information described above. Finally, FIG. 7C shows an example similar to FIG. 4 above, wherein the user may scroll through a selection of pronunciations common to the English language to find an equivalent Arabic letter. In the illustrated example, the user has scrolled to "sounds like heavy Q", and an Arabic letter is displayed. A button for selecting this pronunciation e.g., the button with "Qatar" as a pronunciation example and a corresponding Arabic letter) is provided. In each of these cases, when an Arabic letter is selected by a user, the complete Arabic word, at the top of the screen in these examples, may be updated to include the selected letter. In another example, the translation of the English word "circle" into Arabic letters may be performed in this environment by a user interacting with the computer 10 as described above. A user may use a finger to turn the wheel, select letters, etc. FIG. 7D is a sample instruction screen, and FIGS. 7E and 7F depict sample information screens which may be accessible in the iOS environment. As with the example of FIGS. 6A-6D, the instructions for operating the system 10 and grammar rules used by the user in this example may be found in a guide 900, for example the guide 900 shown in FIGS. 9A-9G.

FIG. 8 illustrates the Arabic alphabet. Note that, in an embodiment, the Arabic letters in shade may not be included on the wheel 100. This may be because they represent pronunciations that do not exist in English.

In this specification, "a" and "an" and similar phrases are to be interpreted as "at least one" and "one or more." References to "an" embodiment in this disclosure are not necessarily to the same embodiment. "Comprise", "included" and similar phases are to be interpreted as "include but not limited to".

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) software signature application. However, one skilled in the art will recognize that embodiments of the invention could be a malware detection application.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A physical wheel for converting Latin-derived characters into Arabic characters, comprising:
a primarily circular wheel comprising a Latin-derived character and a corresponding Arabic character, the primarily circular wheel comprising:
a first side, the first side comprising a first overlay smaller than the primarily circular wheel, the first overlay comprising a first tab and a second tab both extending outward from the first overlay, the first tab comprising a first cut-out window, wherein a middle portion of the first overlay comprises a second cut-out window, the first cut-out window and the second cut-out window allowing a user to choose a Latin-derived character and see a corresponding Arabic character, wherein the first cut-out window comprises the Latin-derived character, and the second cut-out window comprises different versions of the Arabic character corresponding to the Latin-derived character; and
a second side, the second side comprising a second overlay smaller than the primarily circular wheel, the second overlay comprising a third tab and a fourth tab both extending outward from the second overlay, the third tab comprising a third cut-out window, wherein a middle portion of the second overlay comprises a fourth cut-out window, the third cut-out window and the fourth cut-out window allowing the user to see: how combinations of Latin-derived letters convert into an Arabic character, or how an Arabic character converts into at least one Latin-derived character.

2. The physical wheel of claim 1, wherein the first cut-out window and the second cut-out window are connected into a single window.

3. The physical wheel of claim 1, wherein the third cut-out window and the fourth cut-out window are connected into a single window.

4. The physical wheel of claim 1, wherein the primarily circular wheel is rotatable with respect to the first overlay.

5. The physical wheel of claim 4, wherein the primarily circular wheel is configured so that rotating the primarily circular wheel with respect to the first overlay changes the Latin-derived character and the Arabic character shown in the first cut-out window and the second cut-out window.

6. The physical wheel of claim 1, wherein the primarily circular wheel is rotatable with respect to the second overlay.

7. The physical wheel of claim 6, wherein the primarily circular wheel is configured so that rotating the primarily circular wheel with respect to the second overlay changes the display of how the combinations of Latin-derived letters convert into the Arabic character, or how the Arabic character converts into the at least one Latin-derived character, shown in the third cut-out window and the fourth cut-out window.

\* \* \* \* \*